(12) United States Patent
Freund

(10) Patent No.: US 8,136,149 B2
(45) Date of Patent: Mar. 13, 2012

(54) SECURITY SYSTEM WITH METHODOLOGY PROVIDING VERIFIED SECURED INDIVIDUAL END POINTS

(75) Inventor: Gregor Paul Freund, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 1104 days.

(21) Appl. No.: 10/907,331

(22) Filed: Mar. 29, 2005

(65) Prior Publication Data

US 2005/0273850 A1    Dec. 8, 2005

Related U.S. Application Data

(60) Provisional application No. 60/521,623, filed on Jun. 7, 2004.

(51) Int. Cl.
*H04L 29/06* (2006.01)

(52) U.S. Cl. ............ 726/11; 726/1; 726/2; 726/3; 726/4; 726/14; 726/22; 726/23; 726/24; 726/25; 713/152; 713/187

(58) Field of Classification Search .................. 726/1–4, 726/11, 14, 22–25; 713/152, 187
See application file for complete search history.

(56) References Cited

U.S. PATENT DOCUMENTS

| | | |
|---|---|---|
| 4,914,586 A | 4/1990 | Swinehart et al. |
| 5,172,227 A | 12/1992 | Tsai et al. |
| 5,412,427 A | 5/1995 | Rabbani et al. |
| 5,475,817 A | 12/1995 | Waldo et al. |
| 5,586,260 A | 12/1996 | Hu |
| 5,623,601 A | 4/1997 | Vu |
| 5,652,621 A | 7/1997 | Adams, Jr. et al. |
| 5,682,152 A | 10/1997 | Wang et al. |
| 5,745,701 A | 4/1998 | Nguyen-Thai et al. |
| 5,754,227 A | 5/1998 | Fukuoka |
| 5,764,887 A | 6/1998 | Kells et al. |
| 5,798,794 A | 8/1998 | Takahashi |
| 5,815,574 A | 9/1998 | Fortinsky |
| 5,818,525 A | 10/1998 | Elabd |
| 5,828,833 A | 10/1998 | Belville et al. |
| 5,832,211 A | 11/1998 | Blakley et al. |
| 5,838,903 A | 11/1998 | Blakely et al. |
| 5,848,193 A | 12/1998 | Garcia |
| 5,857,191 A | 1/1999 | Blackwell et al. |
| 5,864,665 A | 1/1999 | Tran |
| 5,875,296 A | 2/1999 | Shi et al. |

(Continued)

*Primary Examiner* — Edan Orgad
*Assistant Examiner* — Kari Schmidt
(74) *Attorney, Agent, or Firm* — John A. Smart; G. Mack Riddle

(57) ABSTRACT

A security system with methodology providing verified secured individual end points is described. In one embodiment, for example, a method of the present invention is described for controlling access to a particular application, the method comprises steps of: defining firewall rules specifying filtering conditions for incoming network traffic, the firewall rules including an application attribute that allows individual rules to be associated with specific applications, the firewall rules also including extended attributes that allow specification of additional conditions that a given end point is required to meet; intercepting incoming network traffic destined for a particular application for which a particular application-specific firewall rule has been created; examining the extended attributes for the particular application-specific firewall rule, for determining what additional conditions the given end point must comply with in order to communicate with the particular application; if the given end point complies with the additional conditions, allowing the end point to communicate with the particular application; and otherwise blocking the end point to prevent communication with the particular application.

50 Claims, 16 Drawing Sheets

U.S. PATENT DOCUMENTS

| | | | |
|---|---|---|---|
| 5,881,230 A | 3/1999 | Christensen et al. | |
| 5,907,610 A | 5/1999 | Onweller | |
| 5,913,088 A | 6/1999 | Moghadam et al. | |
| 5,917,542 A | 6/1999 | Moghadam et al. | |
| 5,926,105 A | 7/1999 | Wakamatsu | |
| 5,987,611 A * | 11/1999 | Freund | 726/4 |
| 6,008,847 A | 12/1999 | Bauchspies | |
| 6,028,807 A | 2/2000 | Awsienko | |
| 6,064,437 A | 5/2000 | Phan et al. | |
| 6,091,777 A | 7/2000 | Guetz et al. | |
| 6,125,201 A | 9/2000 | Zador | |
| 6,154,493 A | 11/2000 | Acharya et al. | |
| 6,158,007 A * | 12/2000 | Moreh et al. | 726/1 |
| 6,167,438 A | 12/2000 | Yates et al. | |
| 6,243,420 B1 | 6/2001 | Mitchell et al. | |
| 6,247,062 B1 | 6/2001 | Sarkar | |
| 6,249,820 B1 | 6/2001 | Dobbins et al. | |
| 6,269,099 B1 | 7/2001 | Borella et al. | |
| 6,304,973 B1 | 10/2001 | Williams | |
| 6,356,929 B1 | 3/2002 | Gall et al. | |
| 6,393,484 B1 | 5/2002 | Massarani | |
| 6,438,612 B1 | 8/2002 | Ylonen et al. | |
| 6,606,708 B1 | 8/2003 | Devine et al. | |
| 6,721,890 B1 * | 4/2004 | Shrikhande | 726/14 |
| 6,826,697 B1 * | 11/2004 | Moran | 726/23 |
| 7,353,533 B2 * | 4/2008 | Wright et al. | 726/1 |
| 2003/0149887 A1 * | 8/2003 | Yadav | 713/200 |
| 2003/0177389 A1 * | 9/2003 | Albert et al. | 713/201 |
| 2004/0064537 A1 * | 4/2004 | Anderson et al. | 709/223 |
| 2004/0103310 A1 * | 5/2004 | Sobel et al. | 713/201 |
| 2004/0177276 A1 * | 9/2004 | MacKinnon et al. | 713/201 |
| 2004/0243707 A1 * | 12/2004 | Watkinson | 709/225 |

* cited by examiner

_400_
APPLICATION — 407
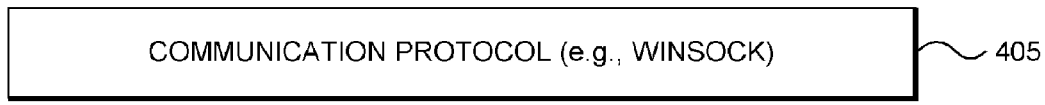
COMMUNICATION PROTOCOL (e.g., WINSOCK) — 405
USER MODE
-------------------------------------------------
TCP/IP — 403
NETWORK ADAPTER — 401
*FIG. 4*

| # | Src | Dst | Protocol | Action |
|---|-----|-----|----------|--------|
| 1 | Local | DNS_Server | DNS | Allow |
| 2 | Any | Local | HTTP | Allow |

FIG. 6A

| # | Src | Dst | Protocol | Action |
|---|-----|-----|----------|--------|
| 1 | Local | DNS_Server | DNS | Allow |
| 2 | Any | Local | HTTP | Allow<br>  Endpoint ...<br>  Authenticate ...<br>  Encrypt (...)<br>    Optional<br>  Redirect |

FIG. 6B

| # | Src | Dst | Protocol | Application | Action |
|---|-----|-----|----------|-------------|--------|
| 1 | Ext | Local | SMTP | Exchange | Allow |
| 2 | Ext | Local | Any | Exchange | Allow<br>  Endpoint ...<br>  Authenticate ...<br>  Encrypt (...)<br>    Optional<br>  Redirect |

FIG. 6C

SECURITY SYSTEM WITH METHODOLOGY PROVIDING VERIFIED SECURED INDIVIDUAL END POINTS

CROSS REFERENCE TO RELATED APPLICATIONS

The present application is related to and claims the benefit of priority of the following commonly-owned, presently-pending provisional application(s): application Ser. No. 60/521,623, filed Jun. 7, 2004, entitled "Security System with Methodology Providing Verified Secured Individual End Points", of which the present application is a non-provisional application thereof. The present application is related to the following commonly-owned, presently-pending application(s): application Ser. No. 09/944,057, filed Aug. 30, 2001, entitled "System Providing Internet Access Management with Router-based Policy Enforcement"; application Ser. No. 10/708,660, filed Mar. 17, 2004, entitled "System Providing Methodology for Access Control with Cooperative Enforcement"; application Ser. No. 60/521,624, filed Jun. 7, 2004, entitled "System and Methodology for Intrusion Detection and Prevention". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 73724 Bytes, created: Jun. 7, 2004 3:15:42 PM; Object ID: File No. 1; Object Contents: Source code.

BACKGROUND OF INVENTION

1. Field of the Invention

The present invention relates generally to computer security and, more particularly, to a system with methodology for securing individual end points.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

With the ever-increasing popularity of the Internet, however, more and more computers are connected to larger networks. Providing access to vast stores of information, the Internet is typically accessed by users through Web "browsers" (e.g., Microsoft® Internet Explorer or Netscape Navigator) or other Internet applications. Browsers and other Internet applications include the ability to access a URL (Universal Resource Locator) or "Web" site. In the last several years, the Internet has become pervasive and is used not only by corporations, but also by a large number of small business and individual users for a wide range of purposes.

As more and more computers are now connected to the Internet, either directly (e.g., over a dial-up or broadband connection with an Internet Service Provider or "ISP") or through a gateway between a LAN and the Internet, a whole new set of challenges face LAN administrators and individual users alike: these previously closed computing environments are now open to a worldwide network of computer systems. A particular set of challenges involves attacks by perpetrators (hackers) capable of damaging the local computer systems, misusing those systems, and/or stealing proprietary data and programs.

The software industry has, in response, introduced a number of products and technologies to address and minimize these threats, including "firewalls", proxy servers, and similar technologies—all designed to keep malicious users (e.g., hackers) from penetrating a computer system or corporate network. Firewalls are applications that intercept the data traffic at the gateway to a Wide Area Network ("WAN") and check the data packets (i.e., Internet Protocol packets or "IP packets") being exchanged for suspicious or unwanted activities.

Another security measure that has been utilized by many users is to install an end point security (or personal firewall) product on a computer system to control traffic into and out of the system. An end point security product can regulate all traffic into and out of a particular computer. One such product is assignee's ZoneAlarm® product that is described in detail in U.S. Pat. No. 5,987,611, the disclosure of which is hereby incorporated by reference. For example, an end point security product may permit specific "trusted" applications to access the Internet while denying access to other applications on a user's computer. To a large extent, restricting access to "trusted" applications is an effective security method. However, despite the effectiveness of end point security products, issues remain in protecting computer systems against attack by malicious users and applications.

One particular problem that remains is how to secure individual end points—that is, the individual computers and devices that access a firm's data (e.g., data stored on corporate servers). Today's environment is characterized by insecure end points accessing data. This results from the fact that one normally assumes that one's own internal end points (e.g., within a corporate setting) can be trusted, since those end points already benefit from some degree of protection. Traditionally, corporate networks have been built with the notion that end points are protected, and a perimeter is used as an enforcement point (e.g., firewall, VPN server, etc.). That basic perimeter enforcement structure works fairly well, but it has a couple of disadvantages. First, security policy assignment (i.e., which policy is used for each user) is somewhat complicated, since at the perimeter there is not much differentiation between users (i.e., at the packet level of incoming and outgoing network traffic). Second, with the ever-increasing availability of wireless network access points, the assumption that there is some sort of a protected or trusted environment within one's enterprise becomes an increasingly more problematic assumption to make. For example, a corporate network can be compromised simply by an individual (authorized or not) plugging in an inexpensive wireless hub into the corporation's internal network. Thus, with the advent of inexpensive wireless hubs, corporate networks have become increasingly susceptible to compromise.

With this present-day situation, security policy assignment is complicated since it is based not only on user and user group (membership/identifications), but it also may be based in part on the particular network that a given user is coming from (i.e., has logged onto). Ultimately, it would be easier to assign a policy based simply on what particular data a given user is actually accessing. Policy assignment is further complicated with existing approaches because of the multitude of paths available for a given user to access a network. Within a large enterprise, the different pathways available from an arbitrary end point to a corporate server are difficult to describe in a manner that would allow simple policy assignment. Thus, in a complicated enterprise network, the traditional choke points are not always available that would allow a convenient point of enforcement/policy assignment.

Another complication with existing approaches is that they rely on different types of technologies, such as encryption, to protect different segments of a network. In many cases, however, this cannot be done reliably. For example, for a VPN solution, a VPN box (hardware) is installed on the home perimeter. Everything on the unencrypted side of the VPN box is susceptible to attack. This vulnerability applies not only to the one end point that one is trying to protect (with VPN) but also any other machine that is connected to that end point as well.

FIG. 1A is a block diagram illustrating a classic network environment with remote access. As shown, the environment 100 includes a remote client 110 comprising an end point computer 111 that connects over the Internet to an enterprise network 120 via a VPN CPE (client premises equipment) device 112. At the enterprise network 120, the incoming remote connection passes through a VPN gateway/firewall 121, which then allows authenticated connections to connect to a server farm 125 (e.g., collection of corporate servers). Each of the segments is traditionally protected using different types of technology. For example, the enterprise network 120 relies on physical security (i.e., that no unauthorized individual is able to access the network) as an important component of its protection. At the remote client 110, the firm is relying on other measurements—that is, the VPN CPE device 112 to secure the end point computer 111.

Although the network environment 100 shown in FIG. 1A appears to be relatively secure, suppose an individual (authorized or not) installs a wireless hub. FIG. 1B is a block diagram illustrating the network environment of FIG. 1A (now shown as 100*a*) after placement of a wireless hub 131 inside the enterprise network 120. This immediately places the network at risk. More particularly, the conventional enforcement or choke point at the gateway 121 is ineffective for enforcing security for connections to the wireless hub 131. For example, unauthorized end point computer 133 (e.g., laptop with 802.11b or 802.11g wireless connectivity) may connect to the enterprise network 120 via the wireless hub 131, thereby bypassing security enforcement at the gateway 121. Similarly, an individual can install a wireless hub at a remote node, such as a VPN client. FIG. 1C is a block diagram illustrating the network environment of FIG. 1A (now shown as 100*b*) after placement of a wireless hub 141 inside the remote client 110. Again, this immediately places the network at risk, since an unauthorized end point computer 143 may connect to the enterprise network 120 via the wireless hub 141. Here, the conventional enforcement at the gateway 121 may be ineffective for enforcing security for connections to the wireless hub 141, since the gateway believes that the traffic is coming solely from the authenticated end point computer 111.

All told, with the advent of such technologies as low-cost wireless access points, it is becoming increasingly more difficult to protect the different segments of a network environment using traditional means. What is needed is a system providing methodology for ensuring that the individual end points themselves are secure. The present invention fulfills this and other needs.

SUMMARY OF INVENTION

A security system with methodology providing verified secured individual end points is described. In one embodiment, for example, a method of the present invention is described for controlling access to a particular application, the method comprises steps of: defining firewall rules specifying filtering conditions for incoming network traffic, the firewall rules including an application attribute that allows individual rules to be associated with specific applications, the firewall rules also including extended attributes that allow specification of additional conditions that a given end point is required to meet; intercepting incoming network traffic destined for a particular application for which a particular application-specific firewall rule has been created; examining the extended attributes for the particular application-specific firewall rule, for determining what additional conditions the given end point must comply with in order to communicate with the particular application; if the given end point complies with the additional conditions, allowing the end point to communicate with the particular application; and otherwise blocking the end point to prevent communication with the particular application.

In another embodiment, for example, a method of the present invention is described for protecting a software program potentially having vulnerabilities from exploitation by malicious network traffic, the method comprises steps of: creating a firewall that is able to monitor network traffic on a software program-specific basis, such that network traffic to a particular software program is monitored according to software program-specific rules that are specifically created for protecting that particular software program; monitoring incoming network traffic and intercepting any incoming network traffic that is determined to be destined for the particular software program; before allowing the network traffic to be received by the particular software program, determining whether the network traffic complies with the software program-specific rules that are applicable for protecting the particular software program; if the network traffic is determined to comply, allowing the network traffic to reach the particular software program; and otherwise blocking the network traffic at a point before the network traffic may invoke execution of program code of the particular software program.

In yet another embodiment, for example, an improved firewall system of the present invention for controlling access to a particular application is described that comprises: a plurality of firewall rules specifying filtering conditions for incoming network traffic, including rules that include an application attribute that allows individual rules to be associated with specific applications, the firewall rules also including extended attributes that allow specification of additional conditions that a given end point is required to meet; a module for intercepting incoming network traffic destined for a particular application for which a particular application-specific firewall rule has been created; a module for examining the extended attributes for the particular application-specific firewall rule, for determining what additional conditions the given end point must comply with in order to communicate with the particular application; and a module for allowing the end point to communicate with the particular application only if the given end point complies with the additional conditions.

In another embodiment, for example, a firewall system of the present invention providing application-specific protection against exploitation of vulnerabilities by malicious network traffic is described that comprises: a plurality of firewall rules for configuring the firewall system to monitor network traffic on an application-specific basis, such that network traffic to a particular software program is monitored according to rules specifically created for protecting that particular software program; a module for monitoring incoming network traffic and intercepting any incoming network traffic that is determined to be destined for the particular software program; a module for determining whether the network traffic complies with the application-specific rules that are applicable for protecting the particular software program before allowing the network traffic to be received by the particular software program; and a module for allowing the network traffic to reach the particular software program if the network traffic is determined to comply, and otherwise blocking any traffic that does not comply at a point before the network traffic may invoke execution of program code of the particular software program.

In still another embodiment, for example, a security system of the present invention providing secured individual end points for end points that may connect to a server is described that comprises: means for monitoring network traffic at the server on a per-application basis, such that network traffic to a particular software program is monitored according to rules specifically created for protecting that particular software program; means, responsive to the means for monitoring, for negotiating security between the server and a particular end point attempting to communicate with the particular software program, for establishing that a given end point is a secured end point; and means for rejecting any incoming network packets that are determined to be destined for the particular software program and which originate from an end point that has not successfully completed negotiation with the server.

BRIEF DESCRIPTION OF DRAWINGS

FIG. 4 is a block diagram illustrating a communication stack.

FIG. 6A is a diagram illustrating a basic firewall configuration.

FIG. 6B is a diagram or a firewall configuration which may specify extended attributes.

FIG. 6C is a diagram or a firewall configuration which specifies an application-specific extended attribute of the present invention.

DETAILED DESCRIPTION

Glossary

Figure 1A:
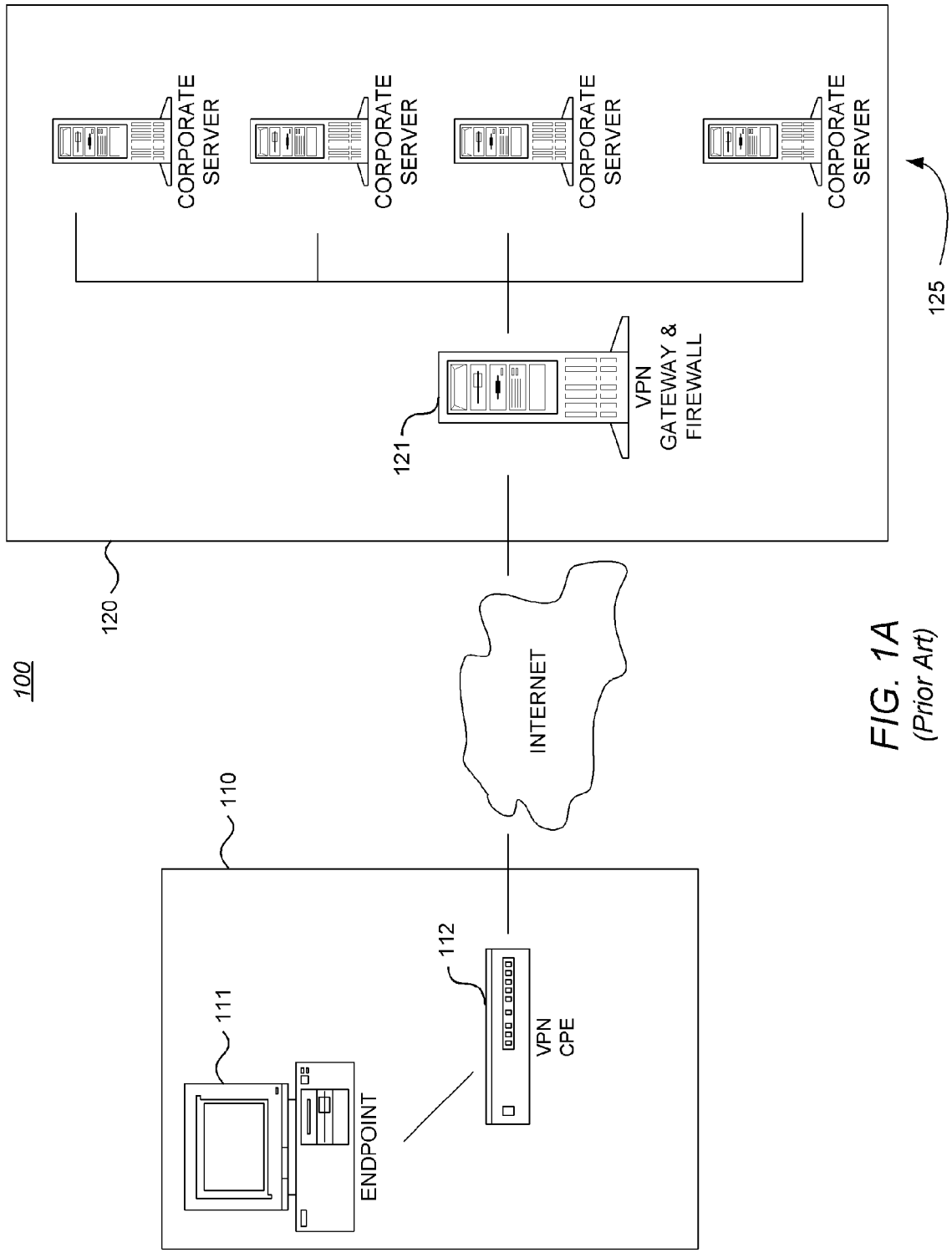
FIG. 1A is a block diagram illustrating a classic network environment with remote access.
Figure 1B:
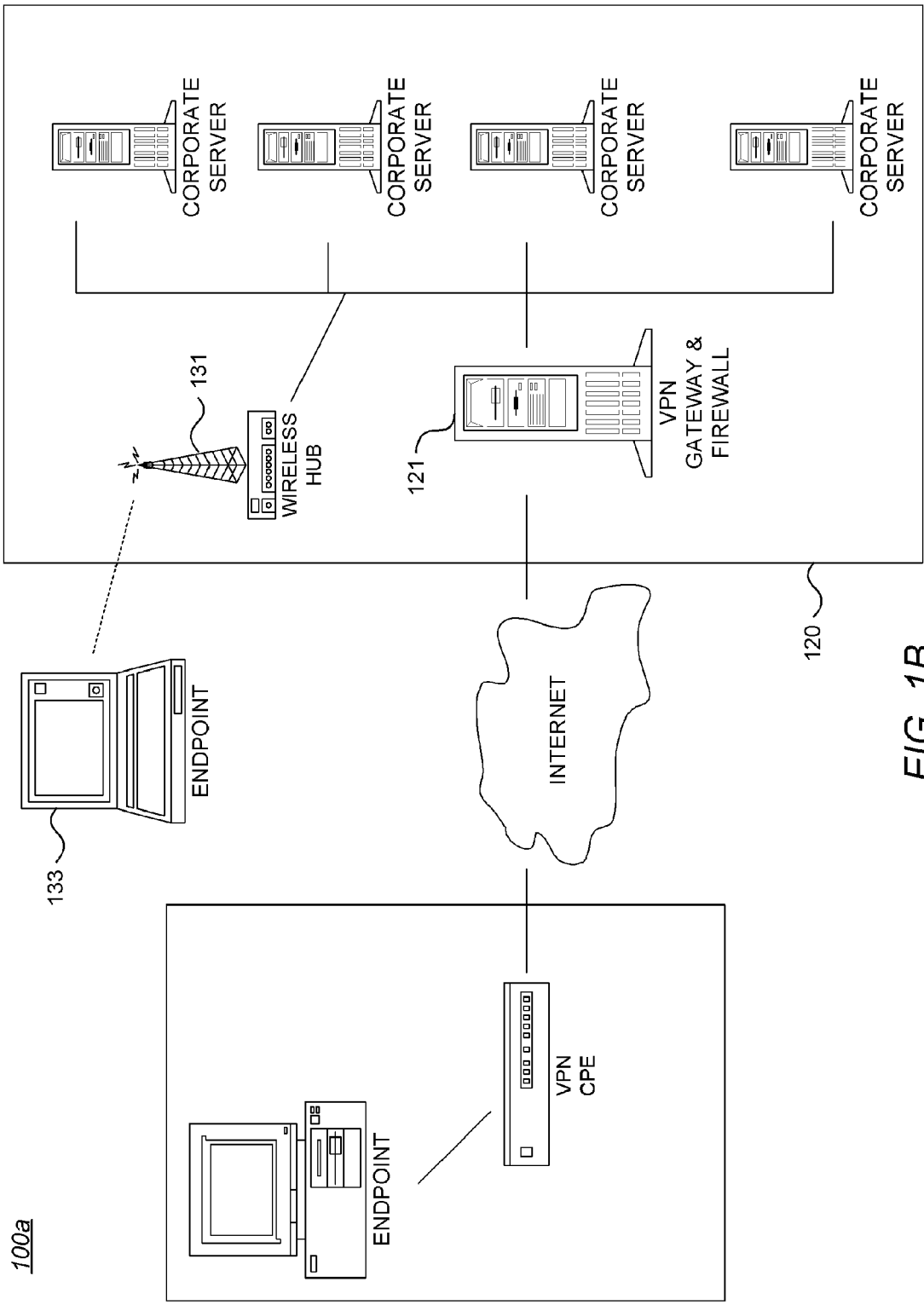
FIG. 1B is a block diagram illustrating the network environment of FIG. 1A after placement of a wireless hub inside the enterprise network.
Figure 1C:
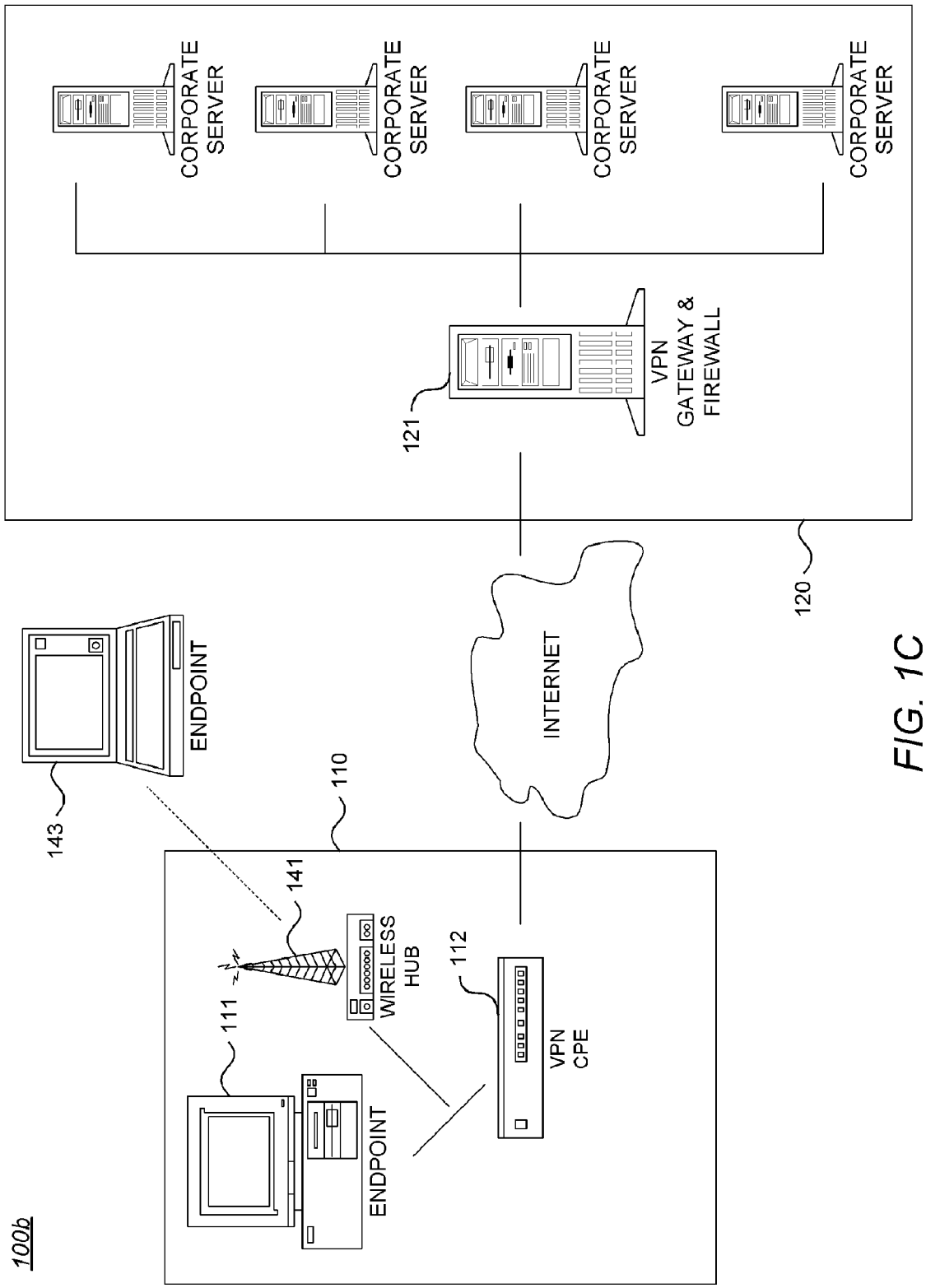
FIG. 1C is a block diagram illustrating the network environment of FIG. 1A after placement of a wireless hub inside the remote client.

The following definitions are offered for purposes of illustration, not limitation, in order to assist with understanding the discussion that follows.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN), such as the Internet, in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/0.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

MD5: MD5 is a message-digest algorithm which takes as input a message of arbitrary length and produces as output a 128-bit "fingerprint" or "message digest" of the input. The MD5 algorithm is used primarily in digital signature applications, where a large file must be "compressed" in a secure manner before being encrypted with a private (secret) key under a public-key cryptosystem. Further description of MD5 is available in "RFC 1321: The MD5 Message-Digest Algorithm", (April 1992), the disclosure of which is hereby incorporated by reference. A copy of RFC 1321 is available via the Internet (e.g., currently at www.ietf.org/rfc/rfc1321.txt).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

RADIUS: RADIUS is short for Remote Authentication Dial In User Service, an authentication and accounting system used by many Internet Service Providers (ISPs). When a client dials in to an ISP it must be authenticated before it is provided access to the network, typically by entering a username and a password. This information is passed to a RADIUS server, which checks that the information is correct, and then permits access to the network. For further information regarding RADIUS, see, e.g., "RFC 2865: Remote Authentication Dial In User Service (RADIUS)," available from the IETF, the disclosure of which is hereby incorporated by reference. A copy of RFC 2865 is currently via the Internet (e.g., currently at www.ietf.org/rfc/rfc2865.txt). See also e.g., "RFC 2868: RADIUS Attributes for Tunnel Protocol Support," available from the IETF.

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Further information on security policies is available in "RFC 2196: Site Security Handbook, (September 1997)", the disclosure of which is hereby incorporated by reference. A copy of RFC 2196 is available from the IETF via the Internet (e.g., currently at www.ietf.org/rfc/rfc2196.txt). For additional information, see also, e.g., "RFC 2704: The KeyNote Trust Management System Version 2", the disclosure of which is hereby incorporated by reference. A copy of RFC 2704 is available from the IETF via the Internet (e.g., currently at www.ietf.org/rfc/rfc2704.txt). In this document, "security policy" or "policy" refers to a set of security policies and rules employed by an individual or by a corporation, government entity, or any other organization operating a network or other computing resources.

SSL: SSL is an abbreviation for Secure Sockets Layer, a protocol developed by Netscape for transmitting private documents over the Internet. SSL works by using a public key to encrypt data that is transferred over the SSL connection. Both Netscape Navigator and Microsoft Internet Explorer support SSL, and many Web sites use the protocol to obtain confidential user information, such as credit card numbers. SSL creates a secure connection between a client and a server, over which data can be sent securely. For further information, see e.g., "The SSL Protocol, version 3.0", (Nov. 18, 1996), from the IETF, the disclosure of which is hereby incorporated by reference. See also, e.g., "RFC 2246: The TLS Protocol, version 1.0", available from the IETF. A copy of RFC 2246 is available via the Internet (e.g., currently at www.itef.org/rfc/rfc2246.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

UDP: UDP stands for User Datagram Protocol, a connectionless protocol that, like TCP, runs on top of IP networks. Unlike TCP/IP, UDP/IP provides very few error recovery services, offering instead a direct way to send and receive datagrams over an IP network. UDP is used primarily for broadcasting messages over a network. For additional information on UDP, see RFC 768, "User Datagram Protocol", the disclosure of which is hereby incorporated by reference. A copy of RFC 768 is available via the Internet (e.g., currently at www.ietf.org/rfc/rfc768.txt).

URL: URL is an abbreviation of Uniform Resource Locator, the global address of documents and other resources on the World Wide Web. The first part of the address indicates what protocol to use, and the second part specifies the IP address or the domain name where the resource is located.

VPN: VPN stands for Virtual Private Network, a network that is constructed by using public wires to connect nodes. For example, there are a number of systems that enable creation of networks using the Internet as the medium for transporting data. These systems use encryption and other security mechanisms to ensure that only authorized users can access the network and that the data cannot be intercepted. For further description of a system providing authenticated access over a public network, see e.g., U.S. Pat. No. 6,324,648, "Secure gateway having user identification and password authentication," the disclosure of which is hereby incorporated by reference. VPN products are available from a variety of vendors. Representative vendors include Check Point Software of Redwood City, Calif., Cisco Systems, Inc. of San Jose, Calif., and Intel Corporation of Santa Clara, Calif.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

Figure 2:
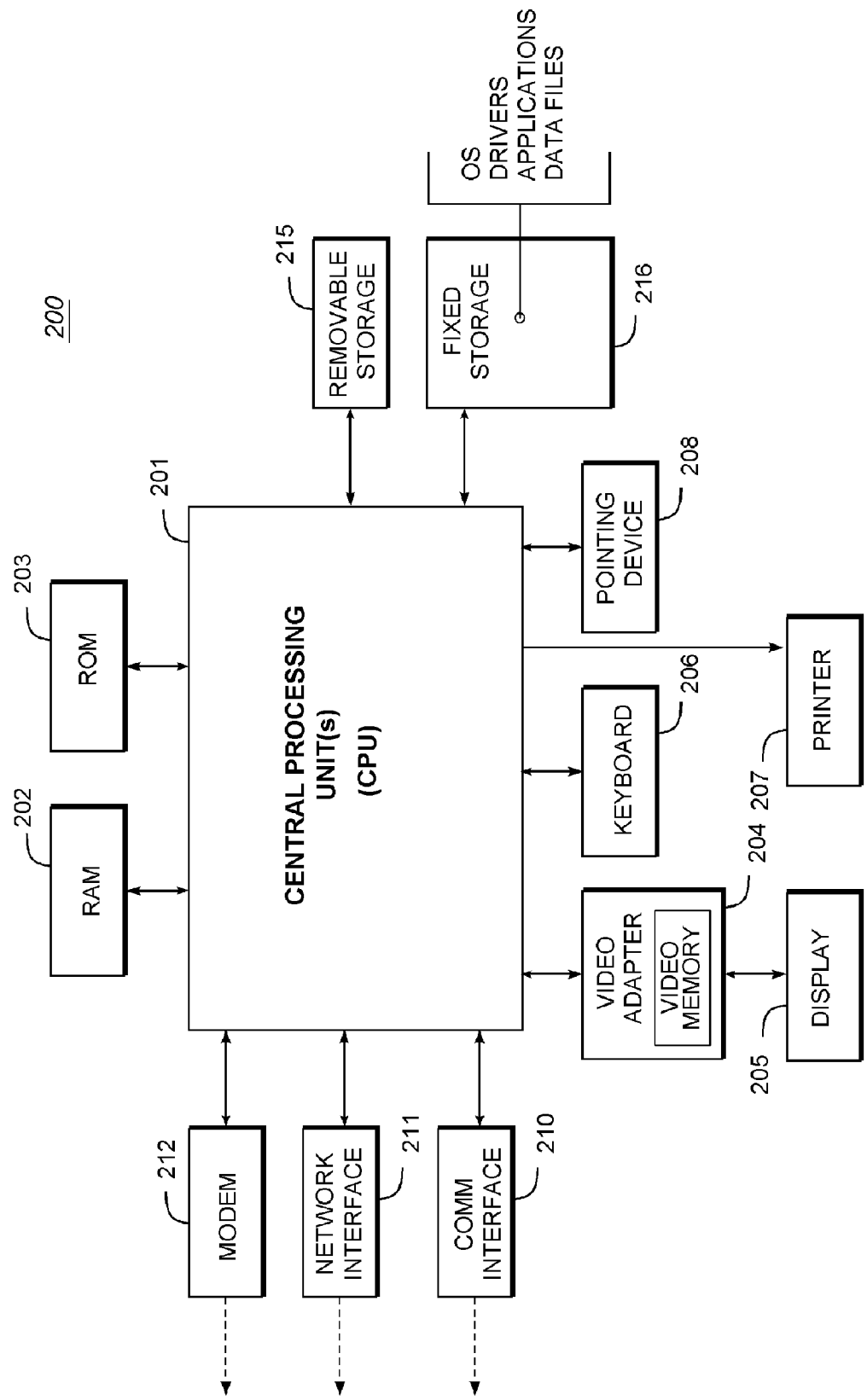
FIG. 2 is a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 2 is a very general block diagram of a computer system (e.g., an IBM-compatible system) in which software-implemented processes of the present invention may be embodied. As shown, system 200 comprises a central processing unit(s) (CPU) or processor(s) 201 coupled to a random-access memory (RAM) 202, a read-only memory (ROM) 203, a keyboard 206, a printer 207, a pointing device 208, a display or video adapter 204 connected to a display device 205, a removable (mass) storage device 215 (e.g., floppy disk, CD-ROM, CD-R, CD-RW, DVD, or the like), a fixed (mass) storage device 216 (e.g., hard disk), a communication (COMM) port(s) or interface(s) 210, a modem 212, and a network interface card (NIC) or controller 211 (e.g., Ethernet). Although not shown separately, a real time system clock is included with the system 200, in a conventional manner.

CPU 201 comprises a processor of the Intel Pentium family of microprocessors. However, any other suitable processor may be utilized for implementing the present invention. The CPU 201 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 202 serves as the working memory for the CPU 201. In a typical configuration, RAM of sixty-four megabytes or more is employed. More or less memory may be used without departing from the scope of the present invention. The read-only memory (ROM) 203 contains the basic input/output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the removable storage 215 or fixed storage 216 into the main (RAM) memory 202, for execution by the CPU 201. During operation of the program logic, the system 200 accepts user input from a keyboard 206 and pointing device 208, as well as speech-based input from a voice recognition system (not shown). The keyboard 206 permits selection of application programs, entry of keyboard-based input or data, and selection and manipulation of individual data objects displayed on the screen or display device 205. Likewise, the pointing device 208, such as a mouse, track ball, pen device, or the like, permits selection and manipulation of objects on the display device. In this manner, these input devices support manual user input for any process running on the system.

The computer system 200 displays text and/or graphic images and other data on the display device 205. The video adapter 204, which is interposed between the display 205 and the system's bus, drives the display device 205. The video adapter 204, which includes video memory accessible to the CPU 201, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP LaserJet printer (available from Hewlett Packard of Palo Alto, Calif.), for creating hard copy images of output of the system.

The system itself communicates with other devices (e.g., other computers) via the network interface card (NIC) 211 connected to a network (e.g., Ethernet network, Bluetooth wireless network, or the like), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication (COMM) interface 210, which may include a RS-232 serial port, a Universal Serial Bus (USB) interface, or the like. Devices that will be commonly connected locally to the interface 210 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 3:
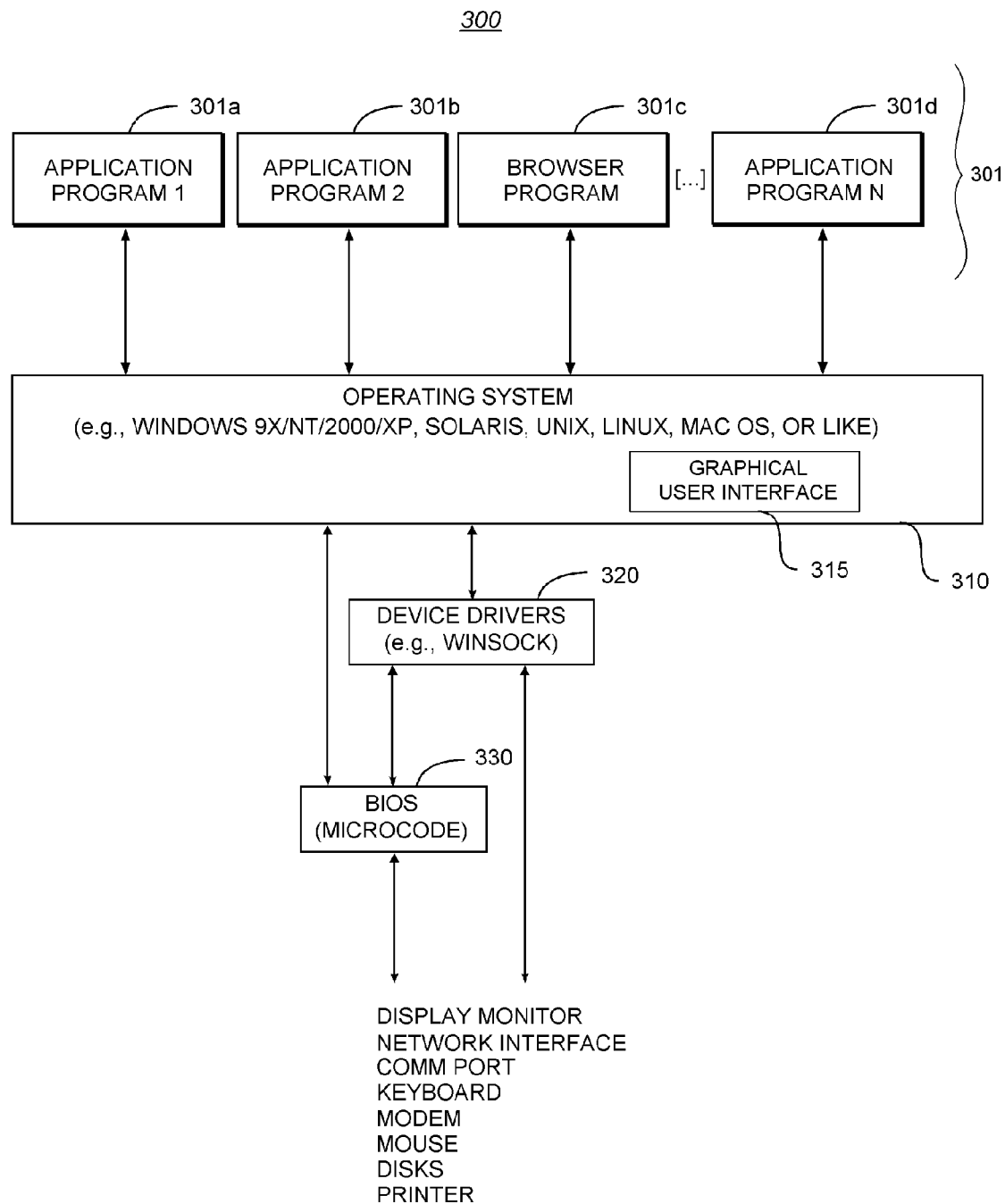
FIG. 3 is a block diagram of a software system for controlling the operation of the computer system.

FIG. 3 is a block diagram of a software system for controlling the operation of the computer system 200. As shown, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301a, 301b, 301c, 301d) may be "loaded" (i.e., transferred from fixed storage 216 into memory 202) for execution by the system 200. The applications or other software intended for use on the computer system 200 may also be stored as a set of downloadable processor-executable instructions, for example, for downloading and installation from an Internet location (e.g., Web server).

Software system 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver—Windows' implementation of a TCP/IP stack) and the system BIOS microcode 330 (i.e., ROM-based microcode), particularly when interfacing with peripheral devices. OS 310 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 310 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., corporate server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Providing End Point to End Point Security

Introduction: End Point Security for Individual Applications

Apart from the previously described wireless hub vulnerability, individual end points are vulnerable at a more fundamental level: at the level of individual applications. A particular problem occurs today in the form of "application vulnerabilities," such as the vulnerability of a given application to be exploited by a buffer overflow attack. Today, many applications (particularly in the Microsoft Windows environment) have well-known security problems which, for one reason or another, have not been remedied. The standard approach in the Microsoft Windows environment to address vulnerabilities is to issue patches. However, the vast multitude of patches now required for a Microsoft Windows installation has reached the point that it itself is highly problematic. Frequently, the patches are rushed out with little or no testing. This has resulted in the release of buggy patches, and in some cases the release of patches that have worse vulnerabilities than the ones being addressed. Users, quite understandably, have been increasingly reluctant to install patches out of fear for breaking an existing installation, or creating worse problems than those being solved. Given that a large number of application exploits remain unfixed, many applications are currently deployed that will allow a malicious user, if he or she can get access to such an application, to obtain authentication inappropriately. Once authentication is obtained, the malicious user becomes a trusted user who is free to bypass other security measures and compromise an organization's network and its corporate data.

Overview of Verified Secured End Points

Because one can no longer depend on the traditional assumptions that segments of a network are protected, the approach of the present invention is to instead place an end point security agent at each server and each access end point, and let each server/access end point pair negotiate security between themselves. In particular, any given server/access end point pair assumes that anything (i.e., network segment) in between the two is suspect (i.e., insecure). With this approach, any communication between an end point and a server is protected in a matter to provide ad hoc trusted communication between the two. Therefore, it no longer matters whether someone (e.g., an unauthorized client) has broken into the enterprise network (e.g., Ethernet) environment, since the corporate servers will not talk to that client until the client has been authenticated. In order to achieve this result, the approach of the present invention addresses the following three factors: (1) Authentication: the system must verify/authenticate the identity of the parties involved; (2) Encryption: trusted communication should be encrypted to protect against unauthorized access; and (3) Verified secure end point: verification that an end point is secure.

Securing the Communication Stack

In many cases, users and developers rely on the authentication of specific applications. For example, a user using Microsoft Outlook (e.g., running against Microsoft Exchange) can use that program's built-in authentication mechanism to type in credentials (e.g., username and password). From that simple example, one can describe security in terms of a communication "stack." FIG. 4 is a block diagram illustrating a communication stack 400. At the lowest level of the stack is the network adapter 401. On top of that is the protocol implementation, such as TCP/IP layer 403. Above these two layers one crosses over into user mode. There, the next layer is a communication (Winsock, or similar) layer 405, and then finally above the communication protocol layer sits the application 407.

With application-based authentication (e.g., Microsoft Outlook), a communication request can traverse all of the layers of the stack 400 and reach the final application layer 407 before any sort of security or authentication is enforced. If that application has any type of code defect, the application layer 407 is not robust enough to prevent attacks during the pre- or peri-authentication phase (e.g., buffer overflow vulnerability) that can lead to security breaches. Hence, as illustrated in FIG. 4, the application-level security can be relatively easily compromised by application defects exploited before or during authentication and therefore provides an unreliable mechanism for enforcing security.

In accordance with the present invention, however, authentication is pushed down the stack so that the incoming client or user is authenticated before the application ever has the potential to see malicious packets. With this approach, typical application defects (which often occur during the pre- or peri-authentication phase) are rendered moot, and no longer serve as a source of vulnerability. Therefore, instead of allowing a hacker to probe various weaknesses of an application (e.g., sending malicious data, URL, etc.), the present invention instead provides an agent that intervenes at a lower layer of the stack to effect authentication. In this fashion, the agent may catch the communication at an earlier layer and thus verify whether the communication is a trusted communication from a trusted user/client (or the communication should be rejected as untrusted). With this mechanism, therefore, no one has access to a generic application (e.g., Microsoft Outlook)—that is, an application not really written to a strict security environment (by a security specialist). Instead, users/clients (i.e., the "end points") are not permitted direct access to generic applications until the agent of the present invention can actually verify the identity and security of a given end point.

Policy Assignment

End point security policy assignment is also addressed and improved by the approach of the present invention. A firm may, for example, desire that a given employee have a particular security policy in place based on what his or her role is in the firm and/or what he or she is doing on the network. The traditional approach is to assign a policy based merely on where the user is coming from (e.g., remote access from a home office or from within a LAN) or the user's role in the organization. The policy itself may include basic firewall rules and indicate what applications are allowed to run on the employee's machine. Additionally, the policy may mandate certain third party components, such as mandating that an up-to-date third party antivirus (AV) component be running on the employee's machine. Traditionally, such policies have been assigned based on what network the user is on. For example, if the user is currently logged onto his or her home network, a different policy will be assigned than if that user is logged onto the corporate network. In a similar manner, policies have been traditionally assigned based on who owns the machine (e.g., home machine versus corporate machine). Additionally, policy assignment has taken into account a particular user's group or role in an organization. For instance, an employee in a company's engineering department may have a more lenient policy since that user may need to make several changes to his or her machine (and thus may require administrative privileges). A telephone operator, on the other hand, may have a very strict policy that requires his or her computer to run a very strict preapproved configuration/image. Traditional policy assignment does not work very well because it is does not really take into account where the user is actually going on the network (i.e., what applications, services, and resources he or she is using). In particular, traditional policy assignment is not based on what data a user is attempting to access. The present invention, in contrast, enables the strength of a policy to be directly related to the value of the data that that employee or user accesses.

Consider, for instance, the following real world analogy. In a high-end jewelry store, the security "policy" is very strict. For example, the store may have a security officer at the door and screen customers before allowing them access to the premises. In contrast, a grocery store does not have the same type of valuable items to steal, so the security "policy" is relaxed: the criteria for what constitutes an acceptable visitor is much more lenient. Similarly, if a user accesses a sensitive server or application on a network (e.g., company server storing product development plans), that user or end point should be subjected to a higher level of scrutiny than if the user were simply accessing generic or nonconfidential data (e.g., company server storing general health plan information). In other words, the level of scrutiny should be commensurate with the sensitivity or value of the underlying data that the user wishes to access. Therefore, in accordance with the present invention, policies can be assigned based on the value of the data that is being accessed.

A virtual private network (VPN) may solve one aspect of the problem, in that it provides an encrypted communication channel over a public network. VPN does not provide a solution to the problem, however, since VPN only secures the connection between two points. Either point is at risk of an unsecured clear text transmission. The VPN approach does not address enforcement at the end point, such as applying a particular policy at that end point. The extensible authentication protocol (EAP) may be used to allow a system (e.g., VPN gateway server) to perform additional authentication steps, such as probing an end point (e.g., remote client) to determine what applications and components are running at the end point. However, this mechanism generally operates at a VPN gateway and assumes that the network segments between the VPN gateway and the server providing services or data are secure. Another approach that has been attempted is to add additional hardware that serves as checkpoints that are further removed from the perimeter (typically, on the inside of a network), which basically seeks to departmentalize different user groups.

Given new technologies, particularly wireless technologies, one can no longer sustain the assumption applied in the past that the local area network (e.g., local Ethernet) is a secure environment. Existing security solutions are based on the assumption that there are secure segments and secure end points. However, given the advent of new technologies (e.g., wireless access points), the assumption of secure segments may no longer be valid. For example, Ethernet hardware is too accessible to be protected, and thus may be easily compromised with wireless equipment. In the long run, the traditional assumption that end points are secure (e.g., using physical security) is probably not sustainable either.

"Secure access," in accordance with the present invention, is provided in terms of authentication, encryption, and secure end points. Using conventional end point solutions, one or two of the foregoing will always be compromised. Further, some of the segments are protected by different technologies—technologies that cannot be verified from the server's perspective. For example, with a traditional set up, the server has no idea how an incoming request from a user arrived. Thus, the server has no idea of whether the request came in over a VPN connection, over a backup dial-up connection, or over a wireless connection that has been installed illegally on the network. In addition, even if the server could identify the source of the communication it received, the communication may still have come from an unauthorized source. For example, a communication may have come from an authorized wireless connection on the network, but the connection may have been compromised because of inadequate encryption strength.

System Architecture

General

In accordance with the present invention, the underlying infrastructure and traditional assumptions are completely ignored for purposes of security. Instead, the approach adopted is to assume that there are simply two core components or end points: a client computer and a server. The server is a computer that runs applications (or services) and has data on it. The client is a computer or device that consumes that data. Therefore, the approach of the present invention is to ignore the whole environment in between these two end points and instead simply assume that all network segments are insecure and that no end point (e.g., client) can be trusted by default. Although some of these segments may in fact be secure (and therefore add an additional layer of security), from the perspective of the server and the client, the segments are simply treated as insecure.

Figure 5:
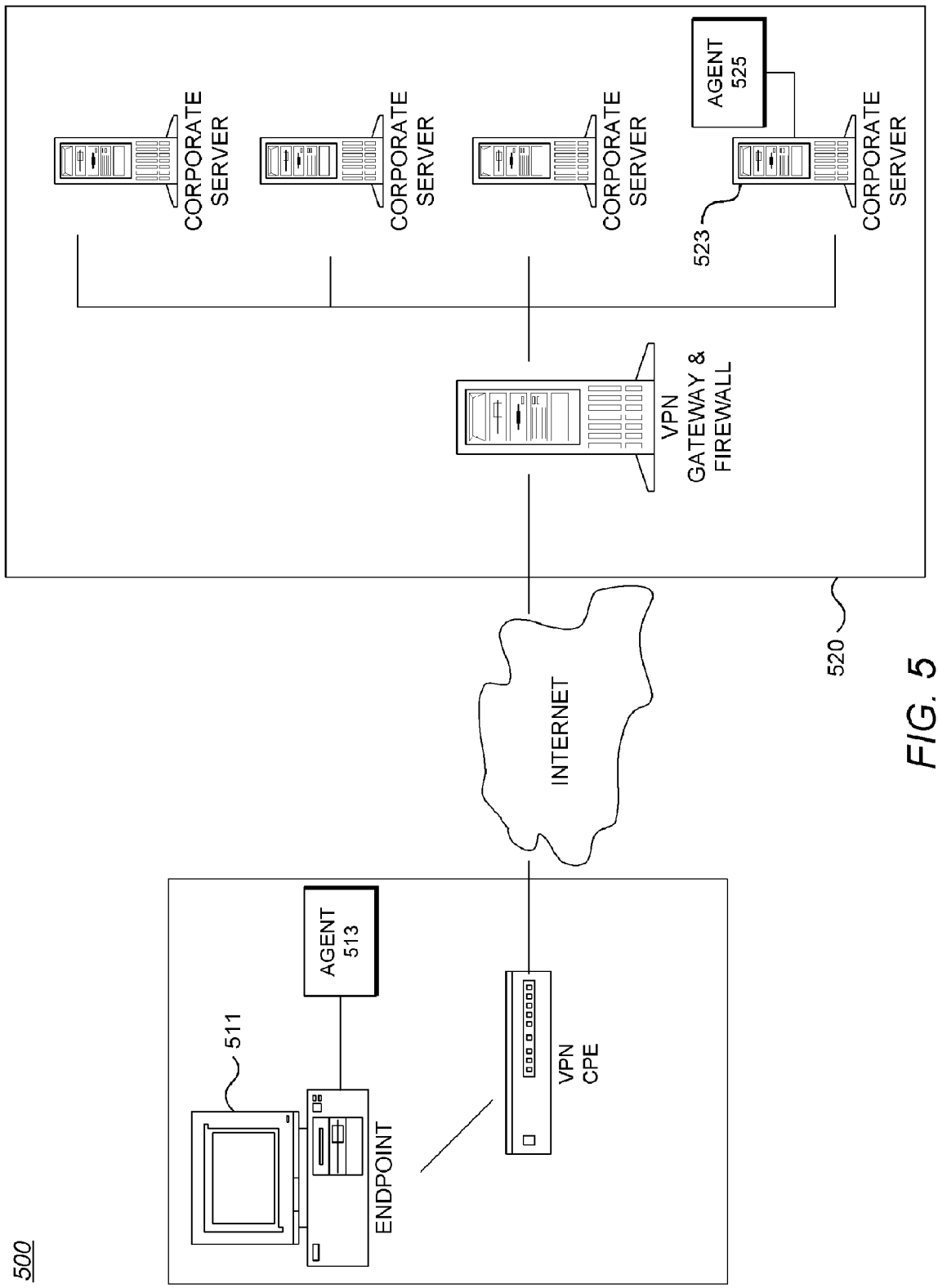
FIG. 5 is a block diagram illustrating an improved security environment of the present invention.

With this new model, a security agent is placed at each client and at each server. At each given end point, the security agent protects the end point and verifies connections to the end point. FIG. 5 is a block diagram illustrating an improved security environment 500 of the present invention. Consider the scenario where a client computer (end point) 511 needs to access the services/data on a corporate server (end point) 523. As shown, the client computer 511 is protected by a security agent 513. Likewise, the corporate server 523 is protected by its own security agent, agent 525. Although additional security components (e.g., VPE CPE device and VPN gateway) may—or may not—be present, their presence or absence is not assumed by the architecture adopted for environment 500. Every time the two end points communicate, a security policy (which may be stored on the server and/or on the client) may be applied to the communication. Optionally, the policy may be stored/maintained by a third component, such as a policy server (not shown). The actual policy applied may be driven by the type of data being accessed. Therefore, for the connection of the client computer 511 to the corporate server 523, the policy applied may be based on the type of data stored on the corporate server 523.

Firewall with Extended Attributes

In the currently preferred embodiment, the policy may be defined using ZoneAlarm® basic firewall semantics, augmented with significant enhancements. FIG. 6A is a diagram illustrating a basic firewall configuration. As shown, each rule is identified by a number, and specifies a source (Src), a destination (Dst), a protocol (e.g., DNS), and an action (e.g., "allow" and "deny"). (Other basic items, such as timestamps, are omitted to simplify the discussion.) For example, the first entry (Rule #1) specifies a standard DNS rule indicating that the Local machine (source) may connect with the DNS_Server (destination) via DNS protocol (Port 53/UDP), with an action of "allow." The source and destination specify IP addresses or dynamically-generated IP (e.g., DNS lookup) addresses.

The second record (Rule #2) shows a source of "Any" (i.e., any source is allowed), the destination is local (Local machine), the protocol is HTTP, and the action is "allow." The entry allows anyone to talk to the Local machine using HTTP protocol (e.g., Port 80), and illustrates the basic setting for a machine that is a Web server. In accordance with the present invention, however, the entry is enhanced. As shown, the "allow" action is a conditional. Therefore, the action is "allow but . . . " enforce additional conditions. For example, the "allow" action may enforce an end point policy (for the remote client). When a client comes to that server, the "allow" action is qualified such that the connection is only allowed if the client has the specified end point policy in place. The policy itself may be locally stored on the server and/or maintained on a policy server (e.g., specified by a URL). The policy may also be stored on the client device in certain cases. As described above, the end point policy may specify what applications are allowed to run on that machine (including registry settings for those applications) and may specify any required third party components (e.g., up-to-date antivirus software). A security policy may also, for example, include a long list of processes (e.g., with a particular file name or checksum) that should not be running on the client device. Further, the policy itself may be based on the server that is being connected to and the type of data available on the server (e.g., a more stringent policy applied at a server which maintains sensitive data such as business plans or customer lists).

As also shown, the "allow" action may specify an "authenticate" qualifier. In the currently preferred embodiment, the server creates an ad hoc SSL tunnel to the client (e.g., over the very same port) and then proceeds to authenticate the client, for example, using an authentication server or authenticating directly (with local credentials). The local security agents (at the respective machines) may participate in this authentication process. Additionally, the "allow" action may specify a particular type of encryption (e.g., beyond the SSL session above). In that instance, the two machines may negotiate an ad hoc encryption session.

Each condition or requirement may have an "optional" qualifier, for example as shown for the encryption qualifier. With the "optional" qualifier, the system attempts to apply the requirement, but if the requirement fails for some reason the connection is allowed anyway. This feature greatly simplifies the task of deploying the system. Upon initial deployment, the system may be configured to specify certain requirements as optional. Then, the system administrator may monitor the system log files to determine what percent of connections are compliant. While compliance may be low after initial rollout of the system, over time compliance will increase and optional qualifiers may be removed, thereby strictly enforcing the respective requirements.

Each condition or requirement may also have a "redirect" qualifier. When a condition or requirement has a "redirect" qualifier, the system will redirect the connection to a specified location (e.g., "sandbox") should that condition or requirement not be met. The sandbox redirect takes the client to a real or pseudo HTTP server that returns a Web page providing feedback that lets the user know what is required for compliance. The sandbox may, for example, inform the user that he or she needs to install a virus update as well as providing convenient access to a copy of the required virus update.

Virtual Firewall Protecting Each Application

The foregoing has been described in terms of a security system that resides in significant part on a host, such as a server computer (e.g., corporate server). However, in an alternative embodiment, the foregoing features may run on top of individual applications. In that configuration, the firewall is effectively moved from the network perimeter and placed above each individual application. Therefore, one may specify, for example, that for Microsoft Exchange (server application) running on a corporate machine, that application is protected by its own application-specific firewall. Further, the Exchange-specific firewall may specify extended attributes, such as illustrated in FIG. 6B. This allows the Microsoft Exchange application to be configured to only accept connections from specific clients that meet specific conditions (e.g., as to end point policy, authentication, encryption, and the like). On that same machine, another application could be running (e.g., FTP server application) with an entirely different set of requirements. In this fashion, the approach of the present invention allows a network firewall to effectively be moved from the perimeter down to the level of individual applications, thereby providing highly differentiated protection for each individual application.

Consider, for instance, the classic problem of allowing incoming traffic on port 80 for a corporate host machine. With a conventional setup, any malicious application running on that machine may listen on port 80. However, with the approach of the present invention, the connection is instead effectively moved directly on top of individual (approved) applications, thereby effectively denying any other applications on the machine access to that network traffic.

By allowing the user to add source, destination, and protocol rules for individual applications, the present invention allows one to build a virtual firewall on top of any desired application. In this fashion, the present invention allows users to use the semantics of firewalls to qualify what actions are allowed for individual applications. Since the rules themselves are processed in order, one may structure the rules in a manner to achieve finely differentiated treatment on different incoming connections. For example, one rule may be triggered by an incoming connection, say, from a company machine located in an office in Germany to apply a specific set of conditions or requirements for communication with a specific application and protocol, a different rule triggered by an incoming connection from another company machine located in Finland (which may have different end point security requirements), and yet another rule triggered by an incoming connection from outside the company.

Application Attribute

The above firewall rules are extended in the currently preferred embodiment to include an additional attribute: a specific application (i.e., application program that is the destination). The addition of an application attribute provides additional flexibility for the firewall. Regardless of the port, protocol, or source of an incoming packet, the system of the present invention can apply per-application filtering of all traffic going to a particular application. For example, if the application is Microsoft Exchange (e.g., server application running on a server machine), an application-specific rule to filter on "Microsoft Exchange" will filter all traffic for that server application regardless of the port, protocol, or source of the incoming traffic.

Two approaches are available for application-specific filtering. In a first approach, a firewall table (object) is maintained for each application (e.g., table in FIG. 6B is instantiated for each application to be filtered). Alternatively, a single firewall table is employed but the table is extended to include an "application" attribute as additional filtering criteria. This latter approach, which is illustrated in FIG. 6C, is the presently preferred approach.

As shown in FIG. 6C, a first rule (#1) is created with a source of External, destination of Local (i.e., this machine, as opposed to Redirecting), protocol of SMTP, application of "Exchange" (i.e., Microsoft® Exchange), and action of Allow. As shown, a second rule is created with a source of External, destination of Local, protocol of Any, application of Exchange (Microsoft Exchange), and action of Allow with Encrypt and End point (i.e., end point security policy). The two configuration rules function as follows. The first rule allows incoming SMTP traffic to reach the application Microsoft Exchange (i.e., the server application running on a server using the extended firewall of the present invention). The second rule requires all other traffic destined for Microsoft Exchange to be encrypted and the end point verified (for compliance with an applicable end point security policy). Note here that the first rule allows incoming SMTP traffic (e.g., from another server, which may not support encryption and/or end point verification) to still reach the Microsoft Exchange application. Therefore, with this configuration, the Microsoft Exchange application may receive incoming SMTP, but all other traffic is required to be encrypted and come from a source that has been verified for compliance with an appropriate end point security policy. The second rule is in effect able to create an ad hoc communication tunnel. This is particularly useful for use with server-based applications. For example, an e-mail server talks not only to an internal environment (where it is able to control the security policy on both ends of the communication) but also must communicate with an external environment that it does not control. The extended firewall attribute of the present invention allows one to fine tune the interaction with the external environment, even if the underlying application (e.g., e-mail server application) does not itself provide that support.

In accordance with the present invention, whenever encryption or authentication is specified, the system of the present invention intercepts the traffic on the communication stack so that the system is able to enforce encryption or authentication, even if the target application is not able to. Further, even if a target application is able to enforce encryption or authentication, the approach of the present invention allows the system to bypass the target application and therefore bypass any vulnerabilities that may be present in the target application. In particular, the approach of the present invention prevents an external source from being able to execute code on a target application (which may have a vulnerability). The moment an external source has the ability to exercise code on a target application, it may potentially exploit vulnerabilities. In accordance with the present invention, this access is shut down. The external source first must comply with the extended firewall rules of the present invention before it is given any chance at all to communicate with the target application.

Processing Incoming Traffic

Figure 7A:
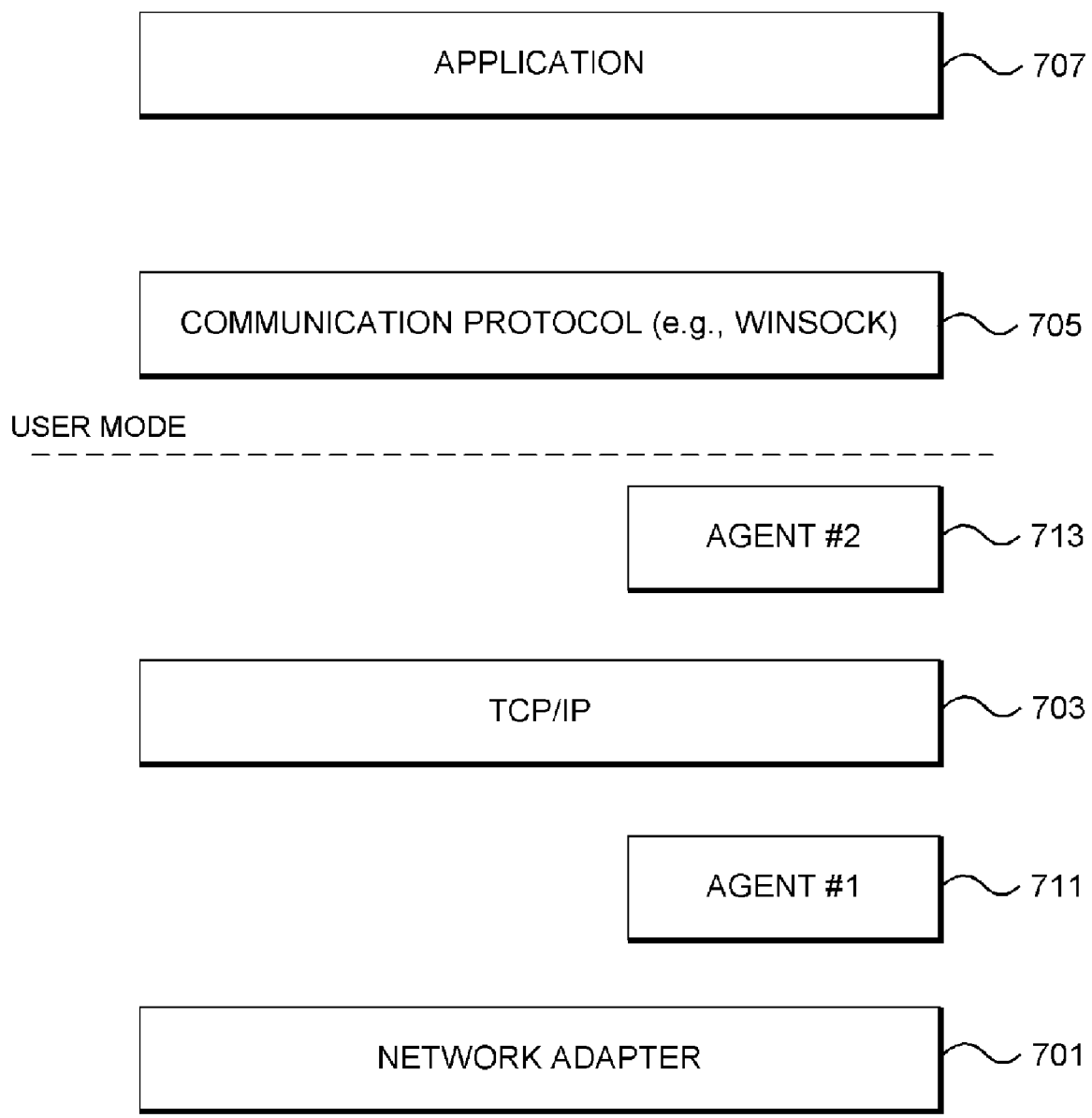
FIG. 7A is an adaptation of FIG. 4 that shows where traffic may be conveniently intercepted.

In accordance with the present invention, both on the client and on the server, an agent is present that intercepts all incoming and all outgoing traffic. Of particular concern is incoming traffic to the server. This traffic is intercepted at two different levels. FIG. 7A is an adaptation of FIG. 4 that shows where traffic may be conveniently intercepted. In particular, a first agent 711 (agent #1) may intercept traffic between the TCP/IP layer (now shown at 703) and the network adapter (now shown at 701); a second agent 713 (agent #2) intercepts traffic just above the TCP/IP layer 703. In the currently preferred embodiment, both agents reside in the OS kernel as that is a more secure environment. However, agent #2 may reside outside the kernel, if desired.

Of particular interest herein is the fact that agent #1 is now in a position to intercept and examine raw IP traffic, including fragmentations, ICMP (Internet Control Message Protocol) messages, and the like, that are processed by the TCP/IP layer. Agent #1 may be configured to only allow certain traffic, using the above described firewall rules with extended attributes. For example, agent #1 may be configured to only allow ping traffic to occur in a certain encrypted, authenticated form. If instead one is only interested in determining which application generated particular traffic, one would use agent #2 for the interception and processing according to its firewall rules. Therefore in use, each agent is individually configured with its own set of rules. Configuration of individual rules themselves depends on where traffic is best intercepted and processed.

Figure 7B:
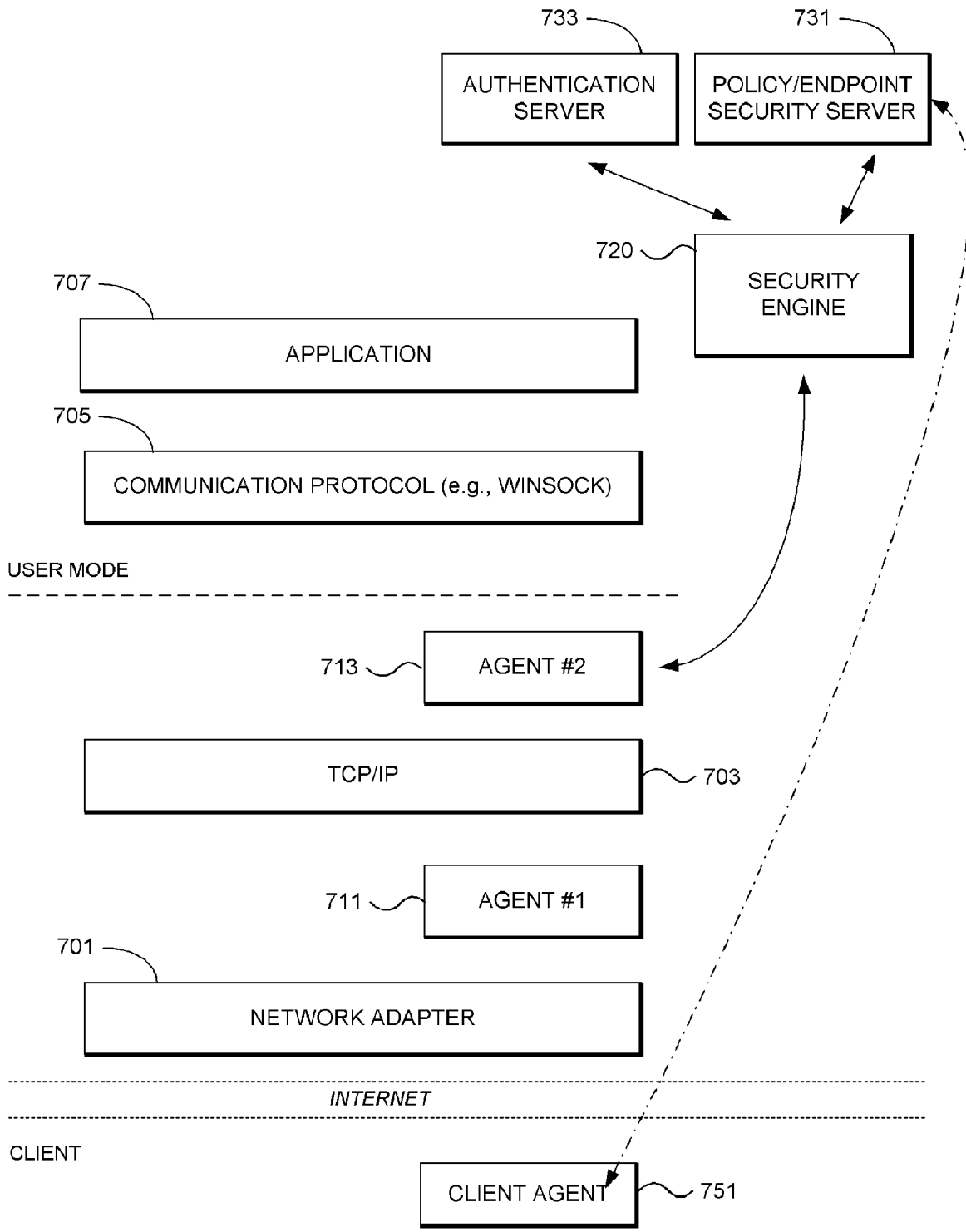
FIG. 7B is a diagram illustrating the interception of traffic by a security engine for implementing methodology of the present invention.

FIG. 7B is a diagram illustrating the interception of traffic by a security engine for implementing methodology of the present invention. Consider an incoming communication packet. Before agent #2 passes that packet out to the communications protocol layer (e.g., Winsock) 705 and on to the application 707, it first passes the packet to a security engine 720 as illustrated in FIG. 7B. The purpose of the security engine 720 is to match the packet or event with a policy. In an exemplary operation, for instance, the system may first look to see if the packet or event is governed by a host-based rule and accompanying qualifiers (e.g., end point authentication and encryption), which is global for the entire computer (e.g., server). Alternatively, the system may look to see if there is a per-application rule that covers the packet or event, since at this level in the stack agent #2 knows which application is the intended recipient. The system processes the packet or event with the list of rules until either the packet or event is allowed or denied. The rule itself that allows the packet may be based on the previously described firewall qualifiers, including source, destination, protocol, time, device, or the like.

In the case of an unqualified "allow" action, the packet is allowed to continue to its intended destination. If, on the other hand, the packet triggers a qualified "allow," additional processing occurs. More particularly, in the case of a qualified "allow," end point security requirements, authentication requirements, and/or encryption requirements may apply. For instance, an end point security qualifier may require the client to comply with a security policy. The policy itself may reside on the local machine, and/or the policy may defer to a policy/end point security server, shown at 731. The policy/end point security server 731 may reside on the same machine (e.g., running as a service), or it may reside on the local area network, or it may reside at a remote location.

The security engine 720 may communicate with the end point security server 731, to report the details of the packet (e.g., IP address and any additional details); additionally, the security engine 720 may communicate with an authentication server 733, for determining the owner of the IP address. The end point security server 731 is instructed to communicate with a corresponding client agent 751 (i.e., an agent residing on the client machine that is attempting to communicate). In particular, the end point security server 731 communicates with the client agent 751 to determine that the specified end point security policy is in force at the client machine. Alternatively, the client machine may have already connected to the server and indicated that it is following a matching end point security policy.

It should be noted that the compliance evaluation for determining whether the required policy is in force at the client machine may be conducted by the client agent 751, by the policy/end point security server 731, or by the security engine 720. For example, the end point security server 731 may send (or have previously sent) a policy or a set of required security attributes to the client agent 751. When challenged by the end point security server 731, the client agent 751 can then evaluate compliance with the policy and simply inform the end point security server 731 of the result of the compliance evaluation. This message informing the server of the result can be quite small, thereby preserving bandwidth as well as reducing processing overhead at the server. However, this structure may require a relatively large policy (or set of required security attributes) to be downloaded to, or otherwise available at, the client. It might be inefficient to send a lengthy list of conditions of this nature to the client every time that compliance is to be evaluated. Therefore, it may be more advantageous for the client agent 751 to send data to the end point security server 731 for evaluation. For example, the security policy for a particular application may be modified to require an updated anti-virus release. In this case, it might be inefficient to require each client to download an entirely new security policy just because the anti-virus rule has been updated. Also, the security engine 720 may interact directly with the client agent 751 to perform the compliance evaluation as an alternative to using an external end point security server. Those skilled in the art will appreciate that the compliance evaluation may be conducted at the server, at the client, or at a separate service (available either locally or remotely) depending on various factors such as the nature of the policy being enforced, the frequency of compliance evaluation, and so forth.

In the instance of a qualifier that also requires the client to "authenticate," the foregoing sequence would be followed, but the client would typically be required to communicate with an authentication server (e.g., authentication server 733) first, with a request to authenticate the client. For example, the client may be required to communicate with a RADIUS server for client authentication. RADIUS servers are widely used to provide authentication, authorization, and accounting services for various types of networks and network access points, which may include switches, remote access devices, wireless access points, firewalls, and virtual private networks (VPNs). The authentication process typically involves obtaining identity and authentication information from the client device using an established protocol such as the RADIUS protocol or the extensible authentication protocol (EAP). If, for instance, the EAP protocol was used, the client would typically assemble appropriate authentication information into one or more EAP packets and forward these EAP packets to the authentication server (e.g., RADIUS server). A number of challenges and responses may be exchanged as part of the authentication process. The authentication server 733 checks the authentication information provided by the client and decides whether to authenticate the client for access. As an alternative to using a separate authentication server, an ad hoc SSL tunnel may be created between the client and the server as hereinafter described (e.g., over the same port) and then the server may proceed to directly authenticate the client (e.g., with local credentials).

In the instance of a qualifier that requires the client to "encrypt," the client would be required to negotiate an encryption session (e.g., SSL, typically directly with the server). If the server has an existing SSL tunnel with that client (e.g., credentials presented with a prior request), that tunnel may be used to satisfy the "encrypt" qualifier. In the currently preferred embodiment, an SSL session is negotiated between an agent on the server and a corresponding agent on the client; that is, the request is not passed onto the application.

SSL consists of a handshake protocol that allows the client agent to negotiate security parameters and keys with the agent on the server, and a record protocol which can use these negotiated keys and parameters to provide secure communications. Sessions are established using the handshake protocol, which authenticates the peers in the session and establishes a shared secret (master secret) which is used to generate a number of keys to secure subsequent communication. Each session may have one or more connections associated with it, however each of these connections will have a unique set of keys. A combination of public and symmetric key encryption, MAC (Message Authentication Code) and digest algorithms are used to achieve the confidentiality, integrity, and authentication properties of the SSL connection. SSL supports a number of different algorithms including RSA, MD5, SHA-1, RC4, and DES. The particular combination of algorithms used is referred to as the ciphersuite.

A client generally specifies the ciphersuite(s) it wishes to support and the server selects one from this list to use for the connection. Depending on the ciphersuite chosen, the server sends several messages to the client which in turn responds with one or more messages. In the usual mode of operation, only the server is authenticated. However, it is possible for the server to request that the client supply a certificate and an authentication message. Once the handshake exchange is completed and the necessary authentication has taken place, each side sends a message to indicate that they are ready to begin secure communications. The client and server use the negotiated master secret and other values that are exchanged to generate a set of keys for the connection. The server then uses these keys to send a "finished" message which is used to check that no handshake messages were modified by an attacker.

The firewall rules themselves are constructed on a per-application basis, a per-host basis, and/or a network basis. As previously described, the firewall rules may include a rule that applies a set of conditions before allowing a connection to a particular application on a particular port using a specified protocol. However, in the currently preferred embodiment the foregoing process is transparent to the receiving application (i.e., application shown at 707 at FIG. 7B). The receiving application simply sees permitted network traffic, but it has no knowledge that a per-application firewall is controlling communication with it. The operation of the low level and high level agents will now be described in more detail.

Operation of Agents

Agent #1, the low level agent, intercepts every packet that goes back and forth across the network adapter. This is accomplished by hooking the traffic from the adapter (using commonly available techniques), and then examining the packet contents. In particular, agent #1 looks at the packet header, packet contents (if applicable), source IP address, destination IP address, and protocol. Then, agent #1 processes this information against the list of rules, for example, based on the source, destination, protocol, time, device, and so forth and so on. From this, agent #1 can determine what action is required for the packet. For an "allow" action, the agent will further examine the applicable rule to determine if additional qualifiers (e.g., authentication, encryption, end point security, and the like) exist. Information about qualifiers is stored locally by the agent in a connection state (data structure). Agent #1 maintains a list of states for the different connections, in a manner not unlike router-based stateful inspection. The only time this list is consulted is for a new request. For an existing request, agent #1 instead refers to a hash table that permits rapid lookup of connection state information.

Agent #2, the higher level agent, essentially functions in a similar manner. However, with agent #2 certain features are no longer available at that level. For example, agent #2 is no longer able to determine which device the packet arrived from. Therefore, agent #2 may not have available all of the information about specific network traffic that is available to agent #1 at the level of the network adapter. Nevertheless, agent #2 is able to implement an application-specific list of rules, since agent #2 has access to application-related information (e.g., which application the packet is going to go to) that is not available to agent #1 (by virtue of it being too low in the network communications stack). Like agent #1, agent #2 maintains state information for the different connections.

When the security engine receives notification about a connection, it will consult the existing state information. (If the connection is new, there will be "negative" state information.) From the state information, the security engine may reference the qualifiers applicable to that connection. At that point, the security engine may apply the qualifiers to the connection to verify that each one is met. In the currently preferred embodiment, this is done (by the security engine) in user mode in order to take advantage of existing operating system facilities (e.g., authentication and encryption) that are available. Additionally, this facilitates the ability of the security engine to work with third party components.

In the event that end point verification is specified as a qualifier, then end point verification of the client is performed. End point verification generally provides checking security attributes of the client. This may be performed by requiring the client to send the current list of security attributes to the security engine (or separate end point security service) packaged in a suitably formatted message. The server may then examines the list of security attributes that it received from the client, and check those attributes using the rules described in the policy. In one embodiment, the UDP protocol is used on both the server and the client. Challenge and response packets are encrypted for transmission between the client and the server. Each packet generally consists of a header, a body, and (optional) additional parameters. In the presently preferred embodiment, the challenge packet has a fixed header and it has additional parameters that can be selected as options in order to check for particular attributes or conditions at the client. For example, a "client version" option requires a specific minimum version of security software be installed on the client. An "anti-virus challenge" option provides for checking for anti-virus enforcement. The security check includes looking for the appropriate code (or other attribute) to verify if the anti-virus program is running on the client machine and if both the anti-virus program and the associated data file are up to date.

Although the above discussion provides for the evaluation to be performed at the server, the evaluation may alternatively be performed (in whole or in part) at the client as previously described. In this case, the server provides a list of the required attributes to the client and the client returns the results of the evaluation. The security service may also issue periodic "heartbeat" challenges every N seconds or minutes, as determined by the established monitoring frequency setting (e.g., monitoring frequency established by a system administrator).

In the instance of a qualifier that requires the client to "authenticate," the client would typically be required to communicate with an authentication server for authentication of the client. Alternatively, the server may consult the authentication server for the results of a prior authentication of the client. Those skilled in the art will appreciate that there are a number of other ways to communicate compliance status using other communication mechanisms. For example, security compliance may be checked using the EAP protocol which defines a challenge-response protocol between an authentication server and a client computer. As another example, the RADIUS protocol, which uses UDP messages to perform a challenge/response protocol, may also be used for compliance checking. Further description of end point verification and authentication is provided in commonly-owned application Ser. No. 10/708,660, filed Mar. 17, 2004, entitled "System Providing Methodology for Access Control with Cooperative Enforcement," the disclosure of which is hereby incorporated by reference in its entirety, including any appendices or attachments thereof, for all purposes.

In the instance of a qualifier that requires the client to "encrypt," the system then must commence a negotiation to exchange credentials as previously described (e.g., the client would negotiate an SSL encryption session directly with the server). The security agent caches credentials. In the instance that SSL is used, a persistent session can be maintained (i.e., without renegotiating).

If an action fails (for whatever reason), there are two choices. If the action fails but the action is optional, then the failure is simply logged. If the action fails but the action is associated with a "sandbox" qualifier, the communication is redirected to a sandbox (server). Here, the actual state is manipulated to become a redirection state, so that the next packet coming in gets automatically redirected to the sandbox.

The sandbox server may be configured to listen for communications on a number of ports. When the sandbox server receives a packet on a particular port, the port that is used for communication signals a particular compliance problem for the client that is redirected to the sandbox. The port that is used may serve to categorize the reason for the redirection of the client in this fashion. The sandbox server then displays an appropriate error page corresponding to the compliance problem that is detected. For example, a client may be redirected to a particular port on the sandbox server to indicate that the client does not have current anti-virus software as required by the policy. As a result, the sandbox server displays an error message indicating that there is a new version of the anti-virus software available and prompts the user to download the new version. Further description of end point verification and redirection to a sandbox server is provided in commonly-owned application Ser. No. 09/944,057, filed Aug. 30, 2001, entitled "System Providing Internet Access Management with Router-based Policy Enforcement," the disclosure of which is hereby incorporated by reference in its entirety, including any appendices or attachments thereof, for all purposes.

Methods of Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

End Point Security Verification

Figure 8A:
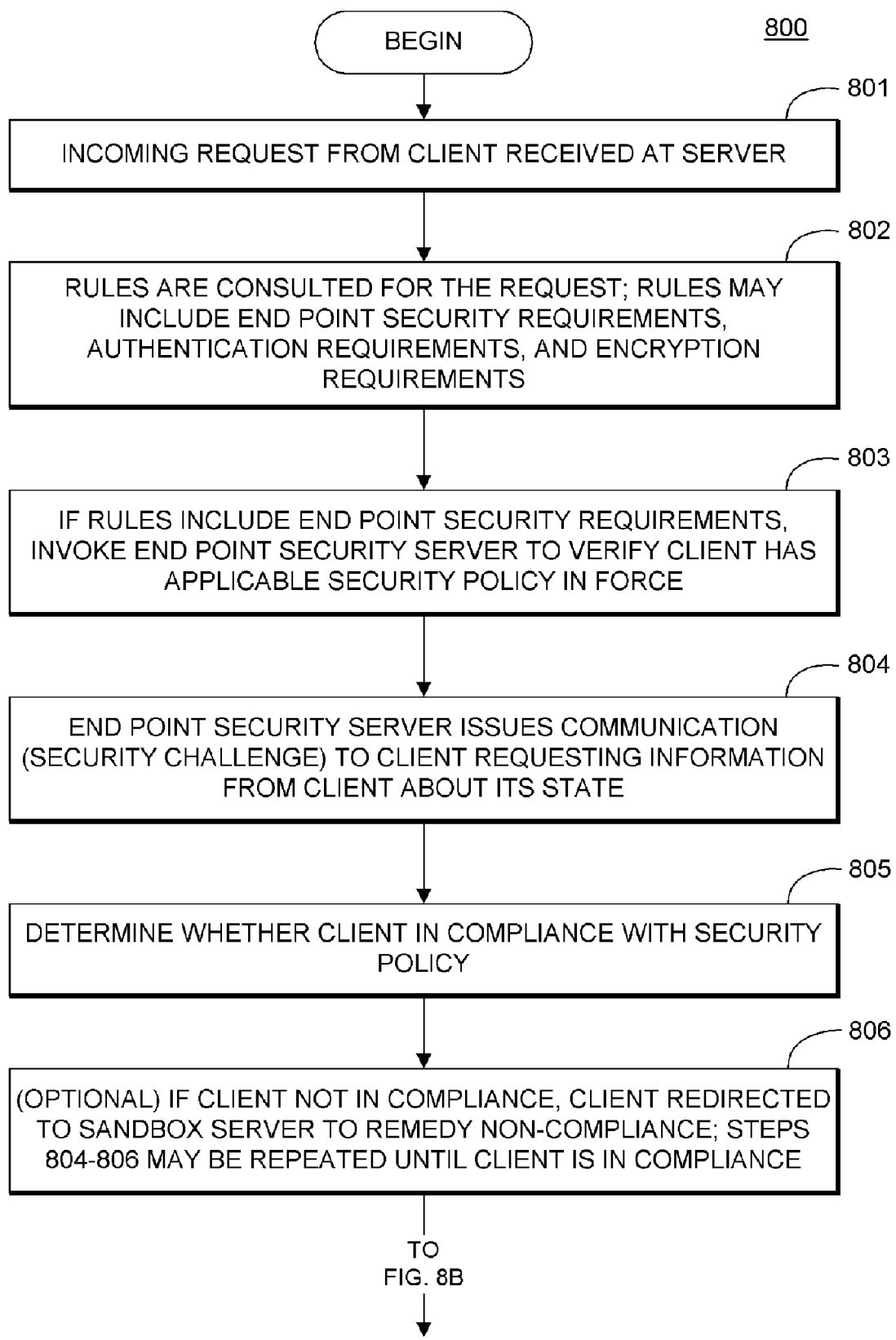
FIGS. 8A-B comprise a single high-level flowchart illustrating a method of the present invention for end point security verification that operates in response to an incoming request to a server.
Figure 8B:
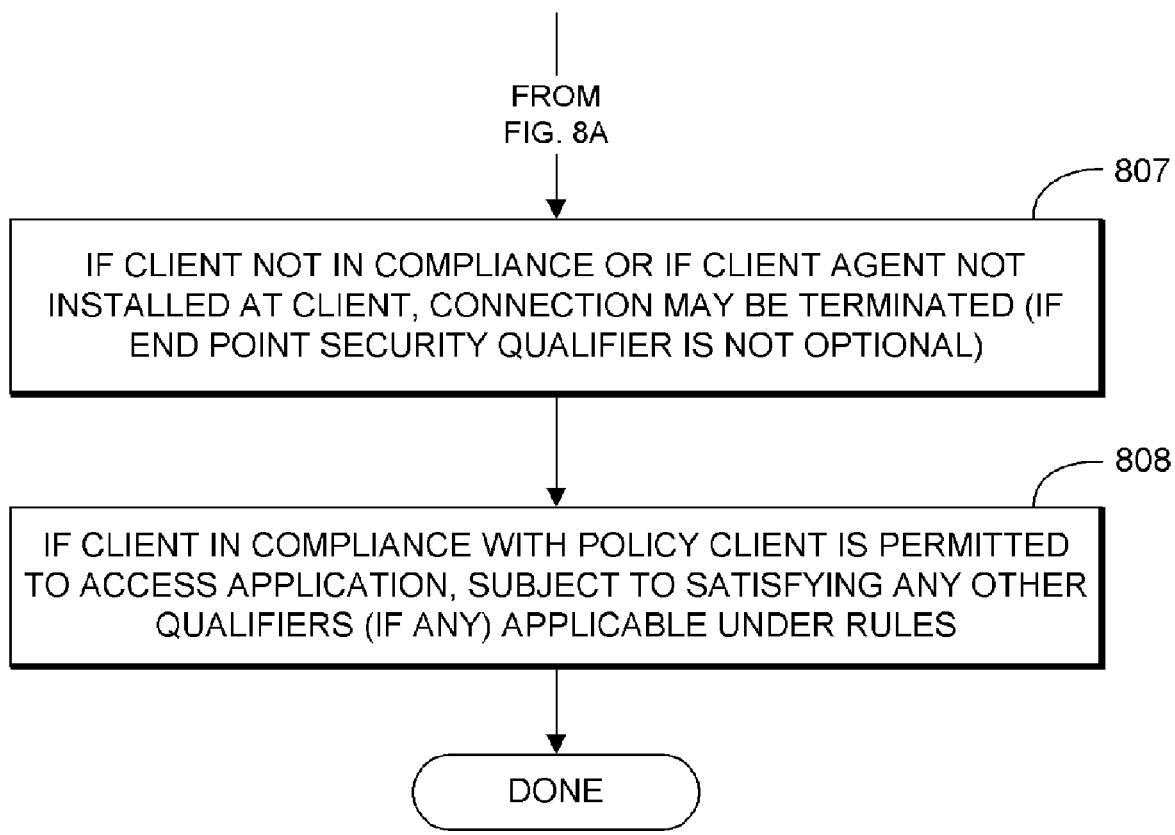

FIGS. 8A-B comprise a single high-level flowchart illustrating a method of the present invention for end point security verification that operates in response to an incoming request to a server. At step 801, an incoming request from a client is received at the server. At step 802, the rules are consulted for the request. In particular, the rules specify additional qualifiers as to end point security requirements, authentication requirements, and encryption requirements. In the case of an end point security requirement, the method invokes the end point security server (with the client's credentials) in order to verify that the client has the applicable end point security policy in force, as indicated at step 803. It should be noted that the security engine may directly communicate with the client as an alternative to invoking a separate end point security module.

At step 804 the end point security server (or security engine) issues a communication (e.g., security challenge) to the client requesting information from the client about its state. Next, a determination is made as to whether the client is in compliance with the security policy at step 805. In the presently preferred embodiment, this determination is made at the client (e.g., by the client agent); however, the determination may also be made by the end point security server based on information received from the client in response to the security challenge. The information received by the security server may, for example, include the policy MD5 of the policy on the client and/or other relevant information required to determine the client's compliance status. There are a number of variations that may be used for communicating compliance status. For instance, security compliance may be checked using the EAP protocol or using the RADIUS protocol as described above. Although an end point security server is employed in the currently preferred embodiment, the client may directly verify its end point security policy (e.g., via the client-side agent), if desired.

If the client is not in compliance with the policy, remedial steps may be required at the client, such as updating other components (e.g., client agent, antivirus software, etc.). At (optional) step 806, the client may be redirected to a sandbox server as previously described in order to remedy any non-compliance. Once the remedial steps have been carried out, the client may again be verified by repeating steps 804-806. If the verification is not correctly fulfilled (i.e., client determined to be non-compliant) or a client agent is not installed, the connection may be terminated (if the end point security qualifier is not optional) at step 807. If the client is in compliance with the policy, at step 808 the client is permitted to access the application at the server as requested, subject to satisfying any other qualifiers (if any) that may be applicable under the rules.

After the initial compliance evaluation, the end point security service (or the security engine) may send out a periodic request ("heartbeat") to the client agent, for the purpose of verifying that the client remains in compliance with the required end point security policy. If the client fails to properly respond to a heartbeat request, the server may be instructed to turn off the connection (even though the client connection was initially approved).

Verifying Authenticity

Figure 9A:
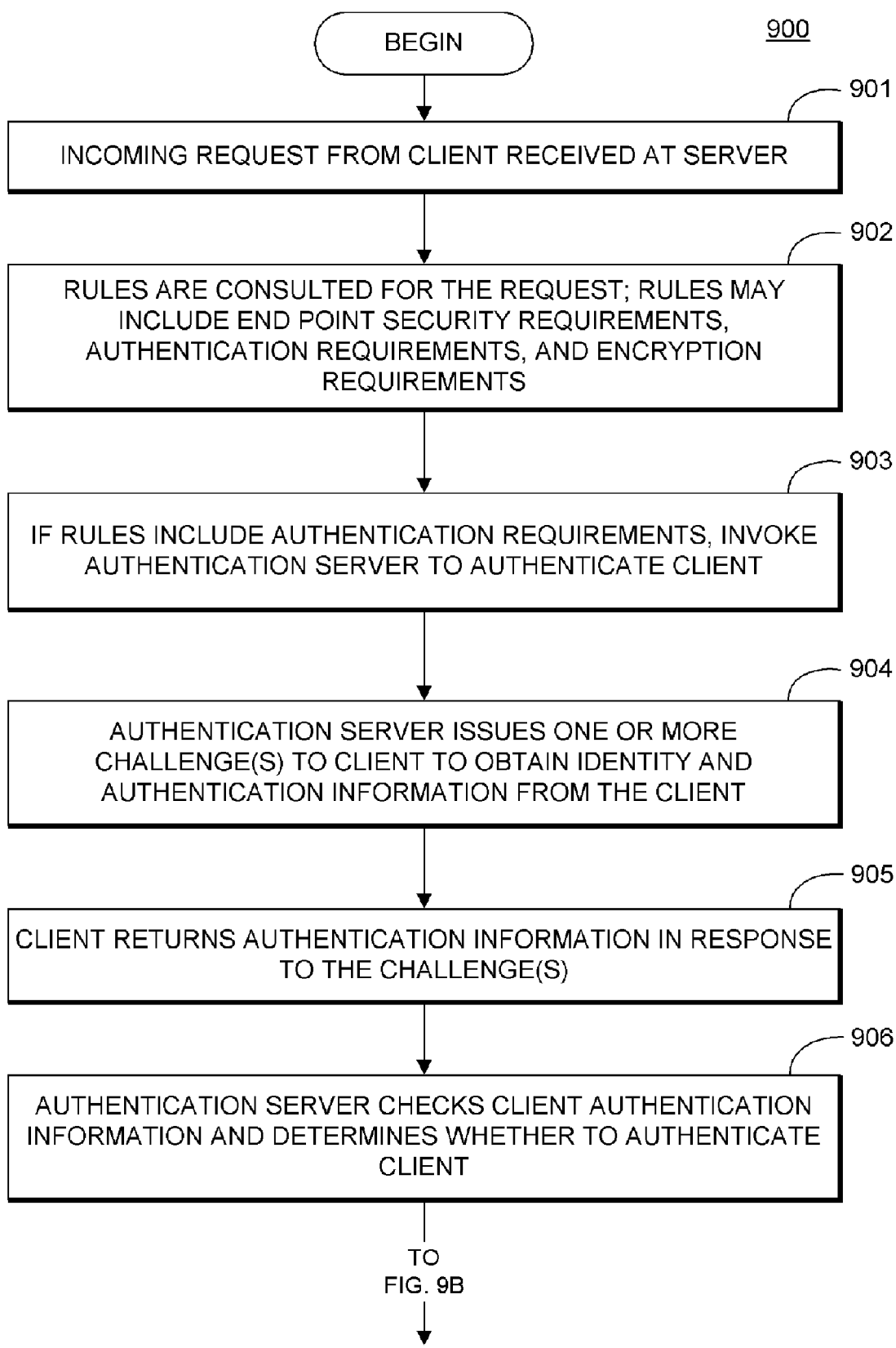
FIGS. 9A-B comprise a single high-level flowchart illustrating a method of the present invention for verifying authenticity of a client.
Figure 9B:
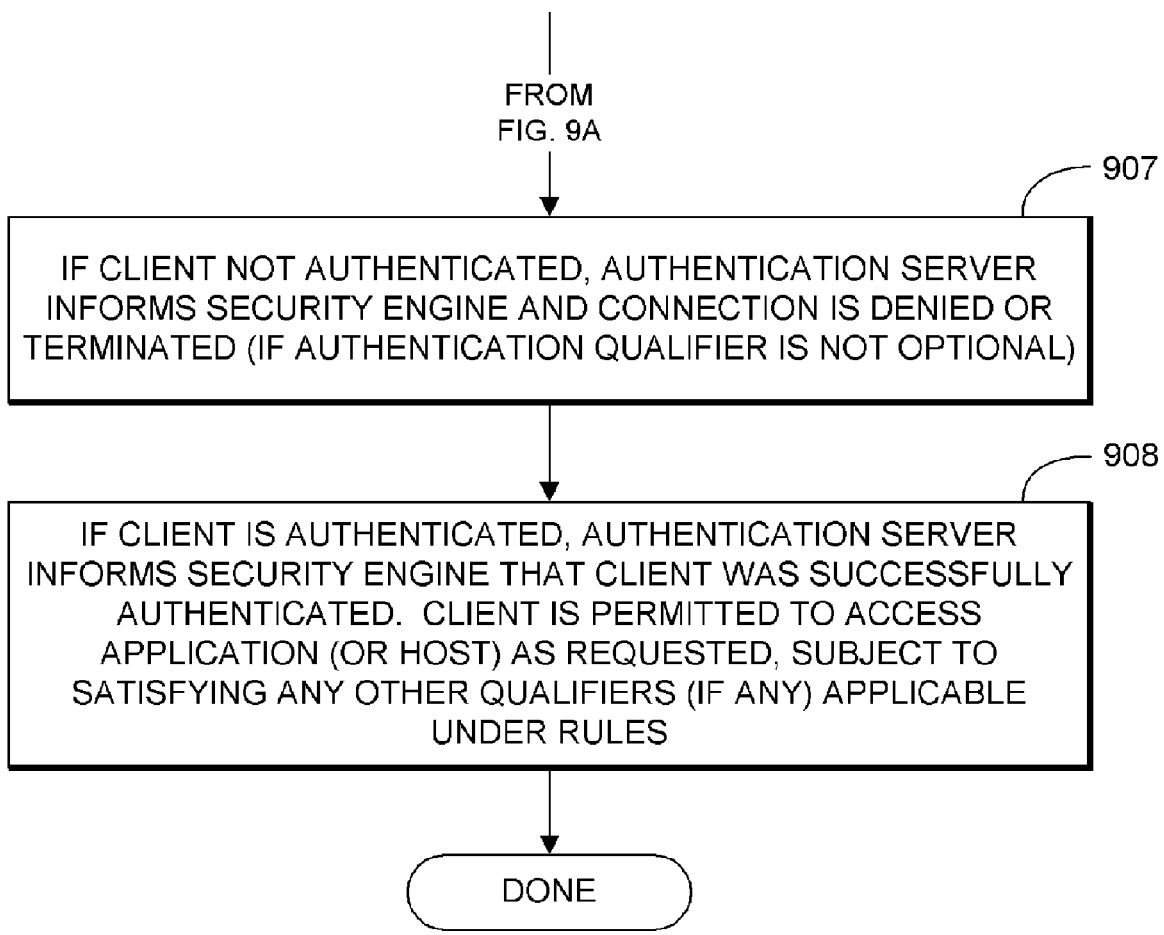

FIGS. 9A-B comprise a single high-level flowchart illustrating a method of the present invention for verifying authenticity of a client. The initial steps are the same as described above in that an incoming request from a client is received at step 901 and the rules are consulted for the request at step 902. In the case of authentication requirements, the method invokes the authentication server in order to authenticate the client at step 903.

At step 904, the authentication server issues one or more challenge(s) to the client. The authentication process typically involves obtaining identity and authentication information from the client device using an established authentication challenge/response protocol. In one embodiment, for example, the authentication server comprises a RADIUS server which communicates with clients using the Extensible Authentication Protocol (EAP). In response to the challenge (s) issued by the authentication server, the client returns authentication information in response to the challenge at step 905. For example, the client may collect appropriate authentication information into one or more EAP packets and forwards these EAP packets in response to the challenge. Alternatively, the RADIUS protocol, which uses UDP messages to perform a challenge/response protocol, may also be used for client authentication. Those skilled in the art will appreciate that various other alternative communication mechanisms may also be utilized for client authentication. For example, certificates may be exchanged by the client and server via a TLS or TNT trust exchange.

At step 906, the authentication server checks the client authentication information and determines whether to authenticate the client for access to the application or host (server) as requested. If the client is not authenticated (e.g., password supplied is incorrect), then the authentication server informs the security engine and the connection is denied or terminated (if the authentication qualifier is not optional) at step 907. On the other hand, if the client is authenticated, the authentication server informs the security engine that the client was successfully authenticated at step 908. If the client is authenticated, the client is permitted to access the application or host (e.g., server) as requested, subject to satisfying any other qualifiers (if any) that may be applicable under the rules.

Establishing Encryption Tunnel Between Client and Server

If a qualifier specifies that encryption is to be used between the client and server, a specifically formatted packet is sent back to the client agent for the purposes of establishing an ad hoc encryption tunnel between the client and the server. If SSL is employed, then an SSL session can be used to host one or more connections with the client (i.e., using previously-agreed keys).

Figure 10A:
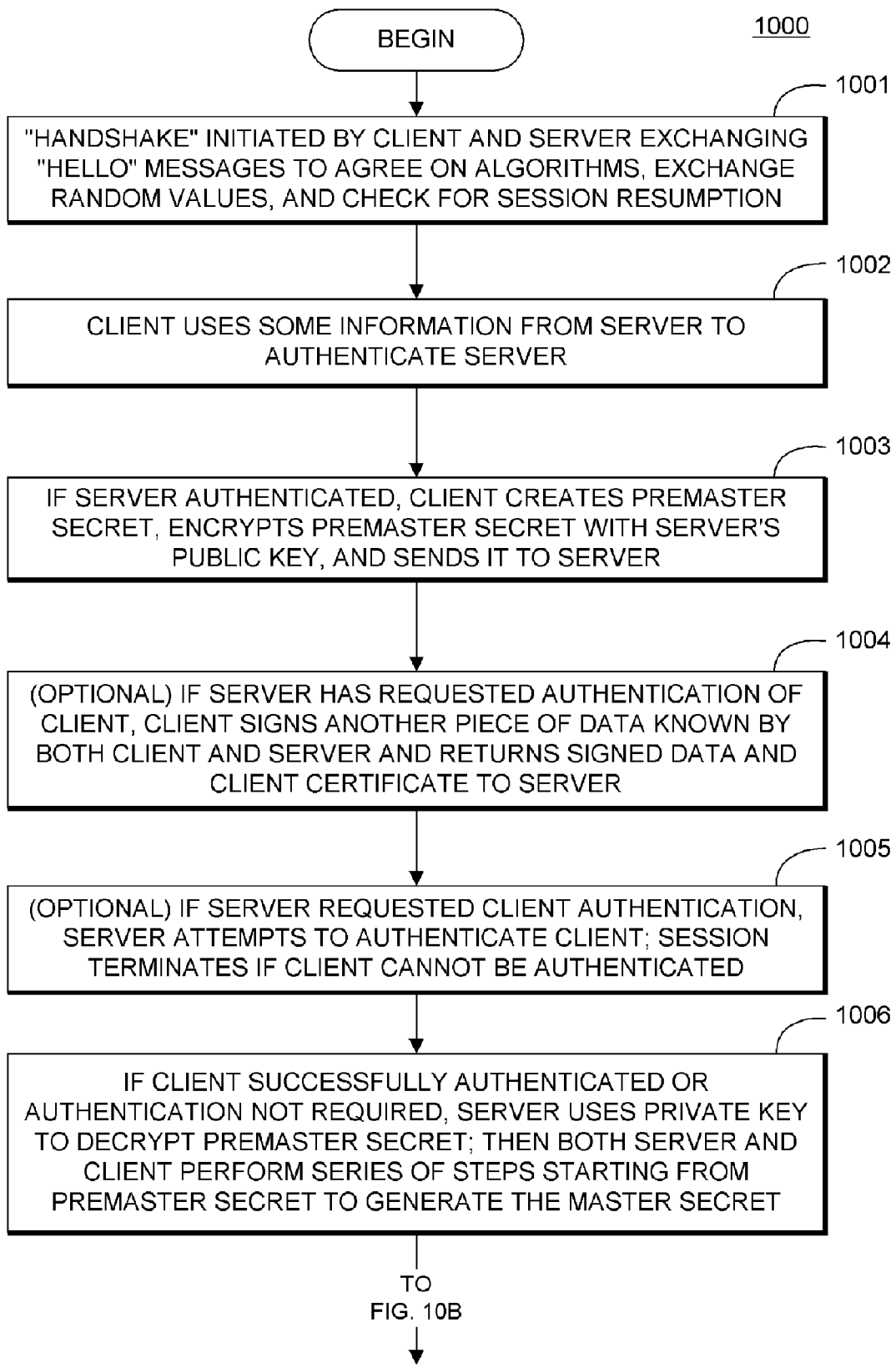
FIGS. 10A-B comprise a single flowchart illustrating the high-level steps involved in order to establish an encryption tunnel between the client and server using SSL.
Figure 10B:
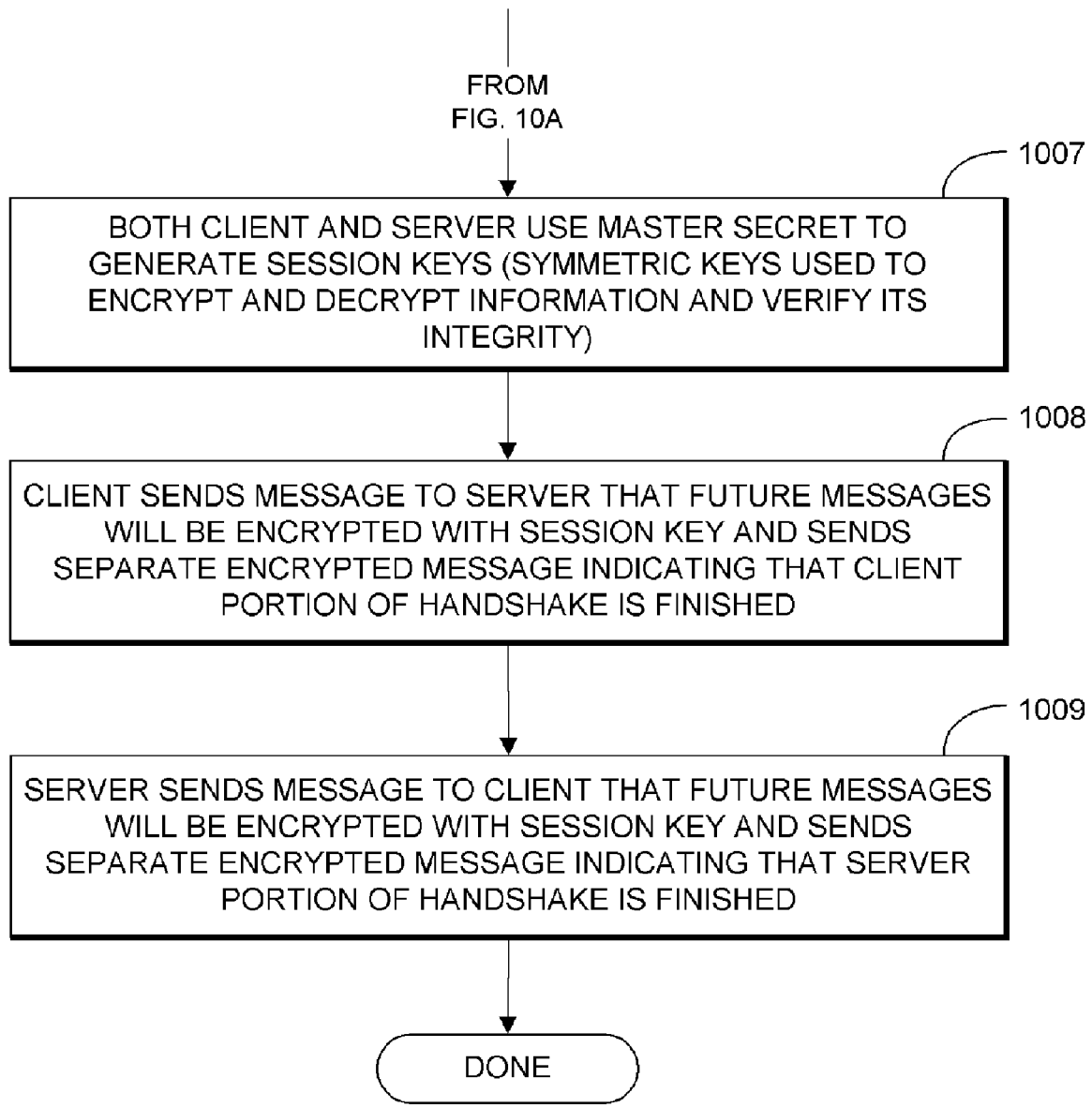

FIGS. 10A-B comprise a single flowchart illustrating the high-level steps involved in order to establish an encryption tunnel between the client and server using SSL. An SSL session begins with an exchange of messages called the SSL handshake. The handshake allows the server to authenticate itself to the client using public-key techniques, then allows the client and the server to cooperate in the creation of symmetric keys used for rapid encryption, decryption, and tamper detection during the session that follows. Optionally, the handshake also allows the client to authenticate itself to the server. The steps generally involved in establishing an SSL session can be summarized as follows.

At step 1001 the client and server exchange "hello" messages to agree on algorithms, exchange random values, and check for session resumption. Typically, the client sends the server the client's SSL version number, cipher settings, randomly generated data, and other information the server needs to communicate with the client using SSL. The server sends the client the server's SSL version number, cipher settings, randomly generated data, and other information the client needs to communicate with the server over SSL. The server also sends its own certificate and, if the client is requesting a server resource that requires client authentication, requests the client's certificate.

Next, at step 1002, the client uses some of the information sent by the server to authenticate the server. If the server can be successfully authenticated, at step 1003 the client (with the cooperation of the server depending on the cipher being used) creates the premaster secret for the session from the information previously exchanged, encrypts it with the server's public key (obtained from the server's certificate), and sends the encrypted premaster secret to the server. If the server has requested authentication of the client, at (optional) step 1004 the client also digitally signs another piece of data that is unique to this handshake and known by both the client and server. In this case the client sends both the signed data and the client's own certificate to the server along with the encrypted premaster secret.

If the server has requested client authentication, at (optional) step 1005 the server attempts to authenticate the client. If the client cannot be authenticated, the session is terminated. If the client can be successfully authenticated, or if client authentication is not required, at step 1006 the server uses its private key to decrypt the premaster secret, then performs a series of steps (which the client also performs, starting from the same premaster secret) to generate the master secret.

At step 1007, both the client and the server use the master secret to generate the session keys, which are symmetric keys used to encrypt and decrypt information exchanged during the SSL session and to verify its integrity—that is, to detect any changes in the data between the time it was sent and the time it is received over the SSL connection. At step 1008, the client sends a message to the server informing it that future messages from the client will be encrypted with the session key. It then sends a separate (encrypted) message indicating that the client portion of the handshake is finished. At step 1009, the server sends a message to the client informing it that future messages from the server will be encrypted with the session key. It then sends a separate (encrypted) message indicating that the server portion of the handshake is finished. The SSL handshake is now complete, and the SSL session has begun. The client and the server use the session keys to encrypt and decrypt the data they send to each other and to validate its integrity.

Advantages

A particular advantage of the present invention is that on the very same port and very same IP addresses involved, the system of the present invention may enforce a discreet communication negotiating end point security policy, authentication policy, and encryption policy. These requirements get added to the firewall state, such that during firewall operation the system of the present invention may enforce these requirements (even though a particular target application itself remains unaware that these requirements are being applied). To the application, the IP traffic it receives simply looks like normal traffic; the application is not aware that certain traffic may be blocked or that permitted traffic is subjected to additional requirements.

During typical operation, a firewall consults a set of rules and a state table. For every "connection" (defined as the same pair of IP addresses and same pair of ports/underlying protocol), the firewall creates a connection object that specifies the corresponding state (e.g., "Reject" or "Allow"). In accordance with the present invention, the state is extended to include information about end point security verification, authentication, and encryption. In the currently preferred embodiment, end point security verification is accomplished via a third-party (arbitration) server, which may operate in an independent (i.e., separate) manner. Here, the client would first register with a third-party end point security management server, which is responsible for setting up the client's end point security policy. Now, both parties (client and server) may communicate with the third-party security management server, instead of having the client and server negotiate directly the client's end point security verification. Thus, the server in effect requires the client to first verify its end point security with the third-party security management server, before the server will accept communication from the client.

The "per application" firewall feature and third-party arbitration server feature are especially useful in a situation where one wants to implement a company-wide policy on top of existing protocols regardless of whether the underlying applications (destinations) support it or not. For example, Microsoft Exchange does not support SSL for POP3, but the present invention provides a straightforward means to provide the feature for Microsoft Exchange. In effect, the approach builds an additional security layer on top of the communication regardless of what the application itself does (including regardless of the application's security flaws, and regardless of whether the application cares about the broader environment that it exists in).

Contrast this approach with SSL. There, the client would have to know in advance what the communication protocol is. With the approach of the present invention, the client does not know what the communication protocol is. The server, for its part, may care about authentication and encryption, but typically the server could care less about the security policy of the clients. For example, today a user can log in to his or her bank account using SSL regardless of what the end point looks like. The bank server will have no idea whether the user machine is running a Trojan horse intercepting the traffic on an unencrypted side, or fishing financial items/passwords out of cache memory, or monitoring screenshots, or the like. In accordance with the present invention, in contrast, establishment of the communication is only allowed after all of the environment criteria have been set for that end point.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for controlling access from a client to a particular application running on a server, the method comprising:
    placing a client security agent at the client and a security agent at the server;
    defining firewall rules specifying filtering conditions for incoming network traffic from the client to the server, said firewall rules including an application attribute that allows individual rules to be associated with specific applications, said firewall rules also including extended attributes enforced by said client agent and said server agent that allow different types of communication protocols to be used to access the particular application running on the server, the particular type of communication protocols allowed at a specific point in time being contingent on which additional conditions of said extended attributes the client meets at that time;

intercepting incoming network traffic destined for the particular application for which a particular application-specific firewall rule with extended attributes has been created;

examining the extended attributes for said particular application-specific firewall rule, for determining what additional conditions of said extended attributes the client satisfies, in order to determine what type of communication protocol can be used to access the particular application running on the server;

if the client complies with said additional conditions for a particular type of communication protocol specified in said extended attributes, allowing the client to communicate with the particular application running on the server using said particular type of communication protocol; and otherwise blocking the client from communicating with the particular application running on the server.

2. The method of claim 1, wherein said additional conditions includes a condition requiring the client to authenticate itself.

3. The method of claim 1, wherein said additional conditions includes a condition requiring the client to encrypt its communication with the particular application.

4. The method of claim 1, wherein said additional conditions includes a condition requiring the client to first verify compliance with an end point security policy.

5. The method of claim 4, wherein said condition requiring the client to verify compliance with an end point security policy includes:

requiring the client to first register with a security policy management server, which provides an appropriate security policy that is enforced at the client.

6. The method of claim 5, wherein said condition requiring the given end point to verify compliance with a security policy includes:

receiving a communication from the security policy management server indicating that the client complies with the appropriate security policy provided by said security policy management server.

7. The method of claim 1, wherein each firewall rule specifies a source, a destination, and a protocol.

8. The method of claim 7, wherein each firewall rule specifies an action of Allow or Reject, wherein each action is associated with extended attributes specifying additional conditions that are applied in order to fulfill the firewall rule.

9. The method of claim 1, wherein malicious network traffic destined for the particular application is blocked before ever reaching the particular application.

10. The method of claim 1, wherein vulnerabilities of applications are blocked from exploitation by blocking malicious network traffic at a point before the network traffic has an opportunity to invoke code of applications.

11. The method of claim 1, further comprising:
downloading a set of computer-executable instructions for performing the method.

12. The method of claim 1, further comprising:
downloading from a server a set of computer-executable instructions for performing the method.

13. A method for protecting a software program potentially having vulnerabilities from exploitation by malicious network traffic, the method comprising:

creating a firewall that is able to monitor network traffic destined for multiple software programs on a software program-specific basis, such that network traffic to a particular software program is monitored according to software program-specific rules that are specifically created for enforcing use of particular types of communication protocol allowed at a specific point in time based on a client satisfying at that time additional conditions enforced at the client by a security agent;

monitoring incoming network traffic and intercepting any incoming network traffic that is determined to be destined for the particular software program;

before allowing network traffic from a particular client to be received by the particular software program, determining what particular type of communication protocol is being attempted by the particular client and determining whether the network traffic and particular type of communication protocol complies with the software program-specific rules that are applicable for protecting the particular software program, including determining by the security agent whether the client complies with said additional conditions required for the particular client to use said particular type of communication protocol;

if the network traffic from the client is determined to comply, allowing the network traffic to reach the particular software program using the particular type of communication protocol; and otherwise blocking the network traffic from the client at a point before the network traffic may invoke execution of program code of the particular software program.

14. The method of claim 13, wherein said vulnerabilities include susceptibility to a buffer overflow attack.

15. The method of claim 13, wherein the software program-specific rules identify the particular software program based on the particular software program's name.

16. The method of claim 13, wherein the software program-specific rules include a rule that network traffic destined for the particular software program is only permitted from a client that has first authenticated itself.

17. The method of claim 13, wherein the software program-specific rules include a rule that network traffic destined for the particular software program is only permitted from a client that has first verified that it complies with an end point security policy.

18. The method of claim 17, wherein the software program-specific rules include a requirement that the client first register with a security policy management server, which provides an appropriate security policy that is enforced at the client.

19. The method of claim 18, wherein the software program-specific rules include a requirement of separate verification from the security policy management server indicating that the client complies with the appropriate security policy provided by said security policy management server.

20. The method of claim 13, wherein the software program-specific rules include a rule that network traffic destined for the particular software program is only permitted from a client that will encrypt network traffic sent to the particular software program.

21. The method of claim 13, wherein each software program-specific rule specifies a source, a destination, and a protocol, in addition to indicating a specific software program.

22. The method of claim 21, wherein each software program-specific rule specifies an action of Allow or Reject, and wherein each action is associated with extended attributes specifying additional conditions that are applied in order to fulfill the rule.

23. The method of claim 13, further comprising:
downloading a set of computer-executable instructions for performing the method.

24. The method of claim 13, further comprising:
downloading from a server a set of computer-executable instructions for performing the method.

25. An improved firewall system for controlling access from an end point to a particular application running on a server, the system comprising:
a computer having at least one processor and a memory;
a firewall operating on the computer and having a plurality of firewall rules specifying filtering conditions for incoming network traffic destined for multiple applications, including rules that include an application attribute that allows individual rules to be associated with specific applications, said firewall rules also including extended attributes that allow different types of communication protocol to be used at a specific point in time to access the particular application running on the server, the particular type of communication protocol used being contingent on which additional conditions of said extended attributes a given end point meets at that time;
a module for intercepting incoming network traffic destined for a particular application for which a particular application-specific firewall rule with extended attributes has been created;
a module for examining the extended attributes for said particular application-specific firewall rule, for determining what additional conditions of said extended attributes the given end point satisfies, in order to determine a particular type of communication protocol the given end point can use for communicating with the particular application running on the server; and
a module allowing access to the given end point for communicating with the particular application running on the server when the given end point complies with said additional conditions required for using said communication protocol.

26. The system of claim 25, wherein said additional conditions includes a condition requiring the given end point to authenticate itself.

27. The system of claim 25, wherein said additional conditions includes a condition requiring the given end point to encrypt its communication with the particular application.

28. The system of claim 25, wherein said additional conditions includes a condition requiring the given end point to first verify compliance with an end point security policy.

29. The system of claim 28, wherein said condition requiring the given end point to verify compliance with an end point security policy includes:
a module for requiring the given end point to first register with a security policy management server, which provides an appropriate security policy that is enforced at the given end point.

30. The system of claim 29, wherein said condition requiring the given end point to verify compliance with a security policy includes a requirement that independent verification from the security policy management server must first be received indicating that the given end point complies with the appropriate security policy provided by said security policy management server.

31. The system of claim 25, wherein each firewall rule specifies a source, a destination, and a protocol.

32. The system of claim 31, wherein each firewall rule specifies an action of Allow or Reject, wherein each action is associated with extended attributes specifying additional conditions that are applied in order to fulfill the firewall rule.

33. The system of claim 25, wherein malicious network traffic bound for the particular application is blocked before ever reaching the particular application.

34. The system of claim 25, wherein vulnerabilities of applications are blocked from exploitation, by blocking malicious network traffic at a point before the network traffic has an opportunity to invoke code of applications.

35. A firewall system providing application-specific protection against exploitation of vulnerabilities by malicious network traffic, the system comprising:
a computer having at least one processor and a memory;
a plurality of firewall rules for configuring the firewall system to monitor network traffic on an application-specific basis, such that network traffic to a particular software program is monitored according to rules specifically created for protecting that particular software program, said firewall rules also including extended attributes that allow different types of communication protocol to be allowed at a specific point in time to access the particular software program based on currently-met additional conditions enforced by a security agent at an end point attempting to access the particular software program;
a module operating on said computer for monitoring incoming network traffic and intercepting any incoming network traffic that is determined to be destined for the particular software program;
a module operating on said computer for determining what particular type of communication protocol is being attempted by the network traffic and determining whether the end pointing attempting the particular type of communication protocol complies with both the application-specific rules and additional conditions that are applicable for protecting the particular software program before allowing the network traffic to be received by the particular software program; and
a module operating on said computer for allowing the network traffic to reach the particular software program if the network traffic is determined to comply, and otherwise blocking any traffic that does not comply at a point before the network traffic may invoke execution of program code of the particular software program.

36. The system of claim 35, wherein said vulnerabilities include susceptibility to a buffer overflow attack.

37. The system of claim 35, wherein said rules identify the particular software program based on the particular software program's name.

38. The system of claim 35, wherein said rules include a rule that network traffic destined for the particular software program is only permitted from an end point that has first authenticated itself.

39. The system of claim 35, wherein said rules include a rule that network traffic destined for the particular software program is only permitted from an end point that has first verified that it complies with an end point security policy.

40. The system of claim 39, wherein said rule requiring the end point to verify compliance with an end point security policy requires the end point to first register with a security policy management server, which provides an appropriate security policy that is enforced at the given end point.

41. The system of claim 40, wherein the application-specific rules require independent verification from the security policy management server indicating that the end point complies with the appropriate security policy provided by said security policy management server.

42. The system of claim 35, wherein said rules include a rule that network traffic destined for the particular software program is only permitted from an end point that will encrypt network traffic sent to the particular software program.

43. The system of claim 35, wherein each application-specific rule specifies a source, a destination, and a protocol, in addition to indicating a specific software program.

44. The system of claim 43, wherein each application-specific rule specifies an action of Allow or Reject, wherein each action is associated with extended attributes specifying additional conditions that are applied in order to fulfill the rule.

45. A security system providing secured individual end points for end points that may connect to a server, the system comprising:

a computer having at least one processor and a memory;

a module operating on said computer for monitoring network traffic at the server on a per-application basis, such that network traffic to a particular software program is monitored according to rules specifically created for protecting that particular software program against access using certain communication protocols at a specific point in time by an end point that fails to establish to a security agent resident at the end point that the end point is secured at that time for access to said particular software program using said certain communication protocols;

a module operating on said computer, responsive to said module for monitoring, for negotiating security between the server and a particular end point attempting to communicate with the particular software program, for determining that a given end point has established with its local security agent that it is a secured end point when accessing the particular software program with a particular type of communication protocol; and a module operating on said computer for rejecting any incoming network packets that are determined to be destined for the particular software program and which originate from an end point that has not successfully completed negotiation with the server.

46. The system of claim 45, wherein the network packets that are rejected are blocked at a point before they may trigger execution of program code of the particular software program.

47. The system of claim 45, wherein said secured end point is one that is authenticated.

48. The system of claim 45, wherein said secured end point is one that is verified to have a desired security policy in place.

49. The system of claim 48, further comprising:

an arbitration server that each end point must separately negotiate with, in order to obtain an appropriate security policy.

50. The system of claim 45, wherein said secured end point is one that agrees to encrypt network packets sent to the particular software program.

* * * * *